US008493382B2

(12) United States Patent
Ohta

(10) Patent No.: US 8,493,382 B2
(45) Date of Patent: Jul. 23, 2013

(54) STORAGE MEDIUM STORING THREE-DIMENSIONAL IMAGE PROCESSING PROGRAM, THREE-DIMENSIONAL IMAGE PROCESSING APPARATUS AND THREE-DIMENSIONAL IMAGE PROCESSING METHOD

(75) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 972 days.

(21) Appl. No.: 12/508,015

(22) Filed: Jul. 23, 2009

(65) Prior Publication Data

US 2010/0066734 A1 Mar. 18, 2010

(30) Foreign Application Priority Data

Sep. 16, 2008 (JP) ................................. 2008-235903

(51) Int. Cl.
*G06T 15/00* (2011.01)
(52) U.S. Cl.
USPC ........................... 345/419; 345/420; 345/427
(58) Field of Classification Search
None
See application file for complete search history.

(56) References Cited

U.S. PATENT DOCUMENTS

| 5,798,761 | A | 8/1998 | Isaacs | |
|---|---|---|---|---|
| 6,504,539 | B1* | 1/2003 | Hiraki | 345/427 |
| 7,837,552 | B2* | 11/2010 | Sumi et al. | 463/23 |
| 2003/0043170 | A1 | 3/2003 | Fleury | |
| 2004/0001110 | A1* | 1/2004 | Khan | 345/848 |
| 2005/0057579 | A1* | 3/2005 | Young | 345/649 |
| 2006/0082546 | A1* | 4/2006 | Wey | 345/156 |
| 2006/0088203 | A1* | 4/2006 | Boca et al. | 382/153 |
| 2007/0167801 | A1* | 7/2007 | Webler et al. | 600/459 |
| 2008/0070684 | A1 | 3/2008 | Haigh-Hutchinson | |

FOREIGN PATENT DOCUMENTS

JP 10-295940 11/1998

OTHER PUBLICATIONS

Strauss et al., "An Object-Oriented 3D Graphics Toolkit", Computer Graphics, ACM, vol. 26, No. 2, Jul. 1, 1992, pp. 341-349, 9 pages.
May 4, 2012 European Search Report for EP12158644.0, 8 pages.
McKenna, "Interactive Viewpoint Control and Three-Dimensional Operations", Proceedings/1992 Symposium on Interactive 3D Graphics, ACM Press, Mar. 29, 1992, 4 pages.
Johnson, "Projection and View Frustums" Technical Paper, Utah Computer Science Course CS6360, Mar. 2008, 5 pages.
Jimenez et al. "Gaze-based Interaction for Virtual Environments", Journal of Universal Computer Science, vol. 14, No. 19, Nov. 1, 2008, pp. 3085-3098, 13 pages.
Watt "3D Computer Graphics", Advanced Viewing Systems ((PHIGS and Gks), Adisson-Wesley, 2000, pp. 157-162, 6 pages.

* cited by examiner

*Primary Examiner* — Said Broome
(74) *Attorney, Agent, or Firm* — Nixon & Vanderhye, P.C.

(57) ABSTRACT

A game apparatus functioning as a three-dimensional image processing apparatus includes a CPU. The CPU executes three-dimensional image processing. When a cursor on a display screen is moved according to an instruction from a user, a gazing point is also moved acceding thereto. At this time, a view volume (cone) is deformed such that a gazing point plane is maintained at an original position. Thus, the gazing point and a vanishing point are overlapped with each other on the display screen.

17 Claims, 15 Drawing Sheets

FIG. 9
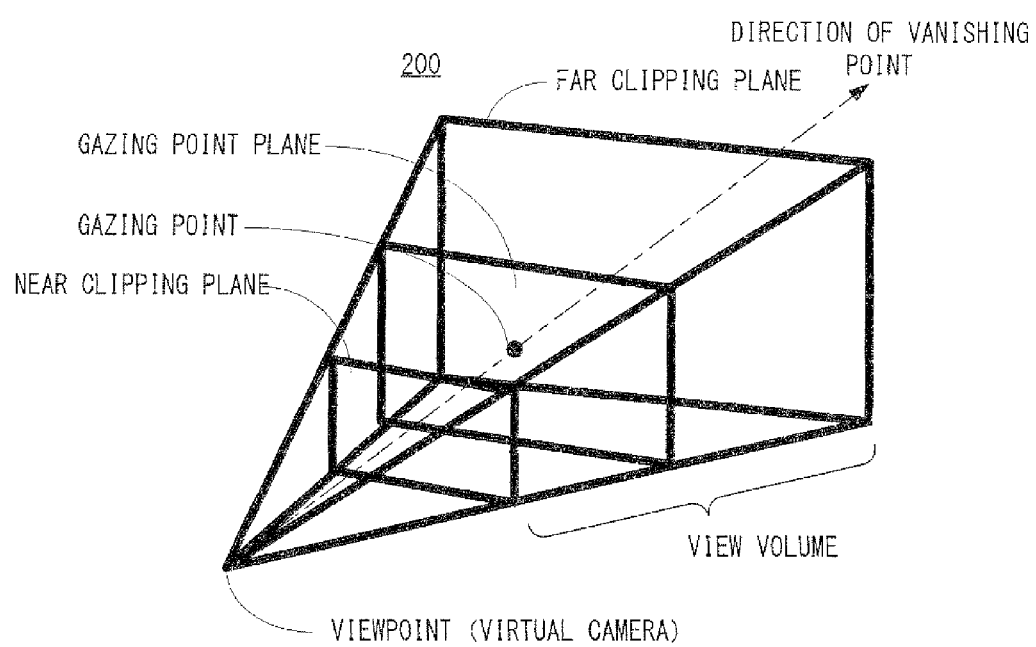
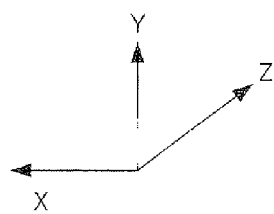

FIG. 10
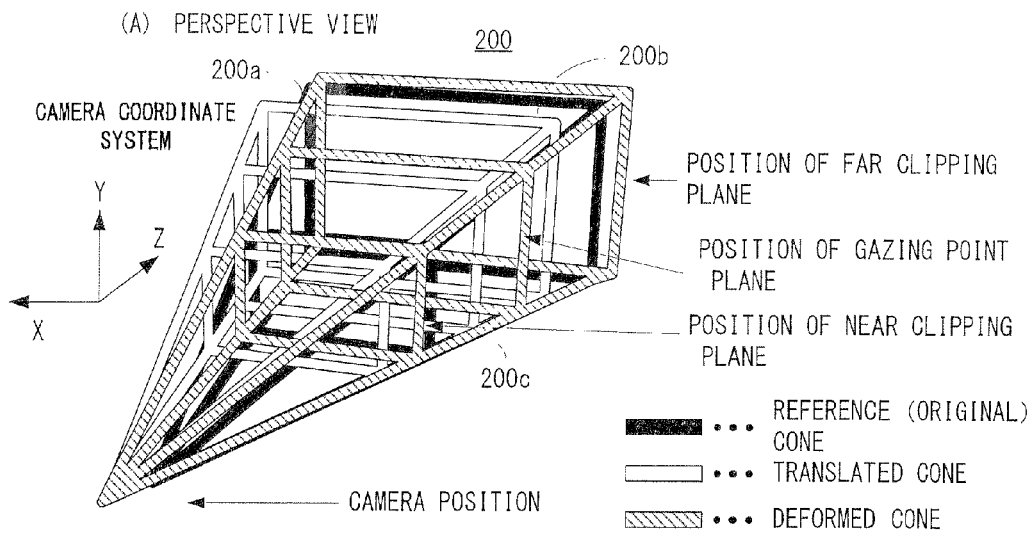
(A) PERSPECTIVE VIEW
POSITION OF FAR CLIPPING PLANE
POSITION OF GAZING POINT PLANE
POSITION OF NEAR CLIPPING PLANE
▬ ... REFERENCE (ORIGINAL) CONE
☐ ... TRANSLATED CONE
▨ ... DEFORMED CONE
CAMERA POSITION
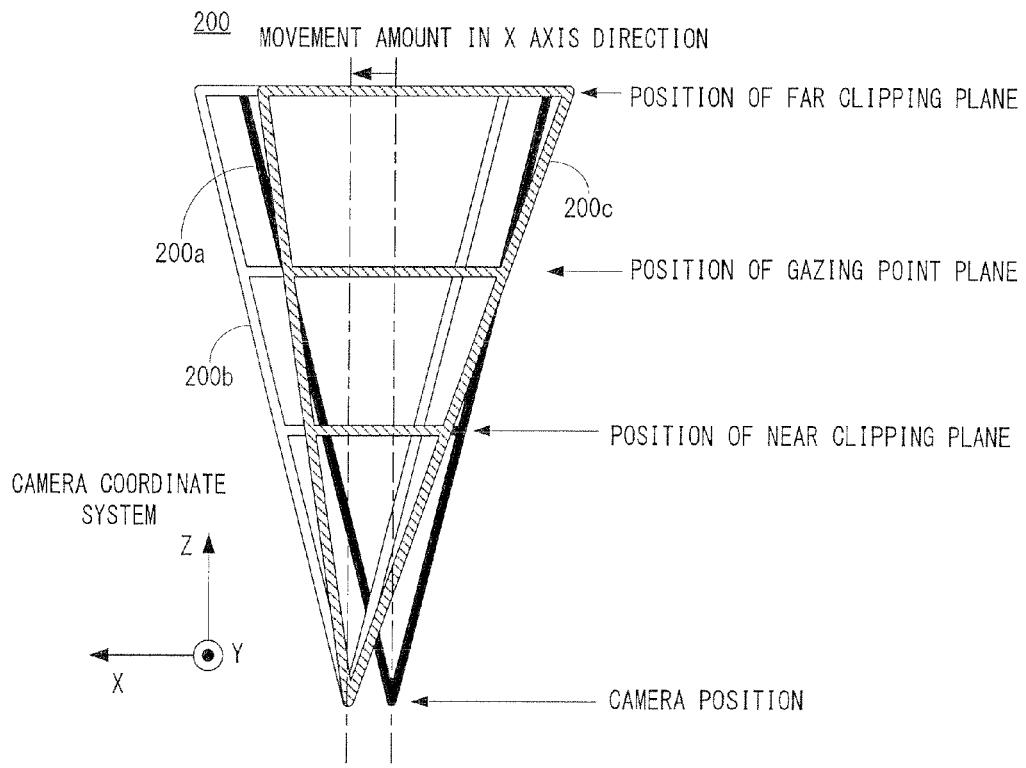
(B) TOP VIEW
MOVEMENT AMOUNT IN X AXIS DIRECTION
POSITION OF FAR CLIPPING PLANE
POSITION OF GAZING POINT PLANE
POSITION OF NEAR CLIPPING PLANE
CAMERA POSITION FIG. 11
(A) SIDE VIEW (RIGHT SIDE VIEW)
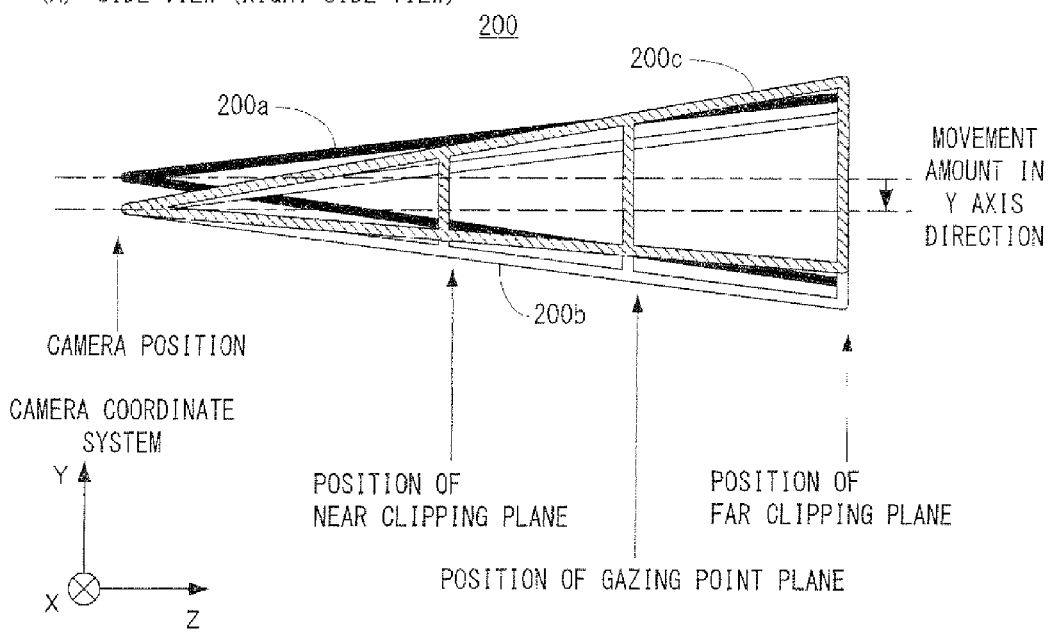
(B) REAR END VIEW (FRONT VIEW WHEN SEEN FROM REAR OF VIRTUAL CAMERA)
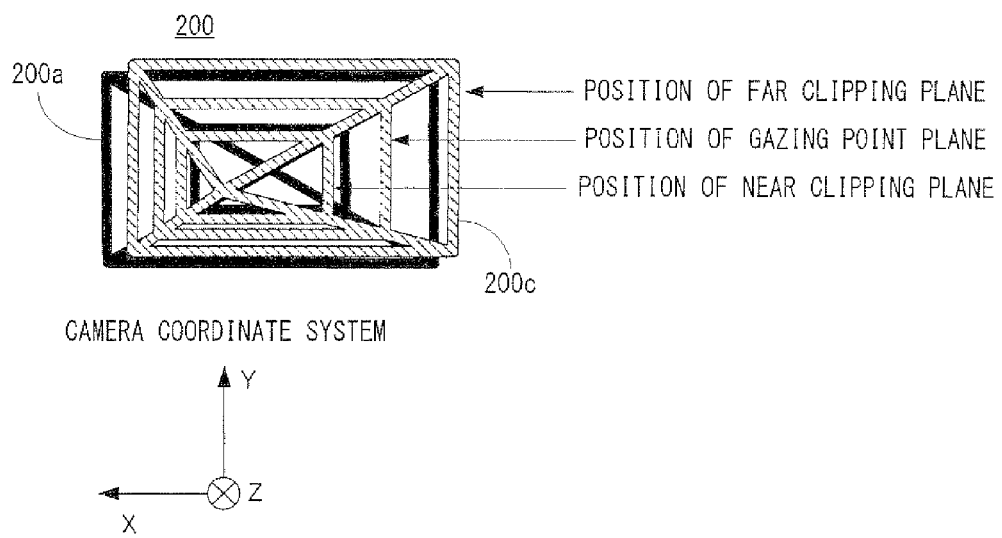

STORAGE MEDIUM STORING THREE-DIMENSIONAL IMAGE PROCESSING PROGRAM, THREE-DIMENSIONAL IMAGE PROCESSING APPARATUS AND THREE-DIMENSIONAL IMAGE PROCESSING METHOD

CROSS REFERENCE OF RELATED APPLICATION

The disclosure of Japanese Patent Application No. 2008-235903 is incorporated herein by reference.

BACKGROUND

1. Field

Example embodiments of the present invention relate to a storage medium storing a three-dimensional image processing program, a three-dimensional image processing apparatus and a three-dimensional image processing method. More specifically, example embodiments of the present invention relate to a storage medium storing a three-dimensional image processing program, a three-dimensional image processing apparatus and a three-dimensional image processing method capable of outputting an imaged image obtained by imaging a three-dimensional virtual space with a virtual camera.

2. Description of the Related Art

One example of the related art is disclosed in Japanese Patent Laid-open No. 10-295940 [A63F 9/22] (Document 1) laid-open on Nov. 10, 1998. The Document 1 describes a shooting game played by operating a player object within a three-dimensional space by utilizing a video game system. While moving the player object in accordance with scrolling in one direction within the three-dimensional space, the player enables the player object to move in the three-dimensional space and make an attack on an enemy object which delivers an attack by operating the player object by means of a controller. When the player object makes an attack on the enemy object, the player overlays a gun sight whose movement is controlled in accordance with the movement of the player object with the enemy object, and then performs all attacking operation.

In general, in a case that a bullet is fired toward the depth direction of the three-dimensional space by the player object rendered in the three-dimensional space, the bullet is controlled so as to move toward a vanishing point in the three-dimensional space from the player object. In the video game system in the Document 1 also, the bullet fired by the player object moves toward the vanishing point in the three-dimensional space. As an index of an orientation from the player object to the vanishing point, a gun sight is displayed. Here, the gun sight is a gun sight whose movement is controlled in accordance with the movement of the player object, so that the player has to perform an attack operation with the gun sight whose movement is controlled in accordance with the movement of the player object overlaid with the enemy object while performing a moving operation of the player object itself. That is, the player has to progress the game, while simultaneously performing a moving operation of the player object and a moving operation of the gun sight. This causes a problem of a complex and difficult operation. In addition, depending on where to arrange the gun sight between the player object and the vanishing point within the three-dimensional space, the player sometimes fails in shooting the aimed enemy object. That is, it is difficult to recognize the three-dimensional space.

SUMMARY

Therefore, example embodiments of the present invention provide a novel storage medium storing a three-dimensional image processing program, a novel three-dimensional image processing apparatus and a novel three-dimensional image processing method.

Furthermore, example embodiments of the present invention provide a storage medium storing a three-dimensional image processing program, a three-dimensional image processing apparatus and a three-dimensional image processing method capable of easily recognizing a three-dimensional virtual space.

Example embodiments of the present invention employ following features in order to solve the above-described problems. It should be noted that reference numerals and the supplements inside the parentheses show one example of a corresponding relationship with the embodiments described later for easy understanding of the present invention, and do not limit the present invention.

A first invention is a storage medium storing a three-dimensional image processing program to be executed by a computer of a three-dimensional image processing apparatus to output an imaged image obtained by imaging a three-dimensional virtual space with a virtual camera on a display, the three-dimensional image processing program causes the computer of the three-dimensional image processing apparatus to function as: an operation input detecting means for detecting an operation input from an input device; an object moving means for moving an object within the three-dimensional virtual space or on the imaged image on the basis of the operation input detected by the operation input detecting means; a parameters setting means for setting a gazing point and a position coordinate of the virtual camera on the basis of a position of the object within the three-dimensional virtual space or on the imaged image; and a view volume deforming means for deforming a view volume of the virtual camera so as not to move a plane including the gazing point of the virtual camera and being in parallel with a projection plane of the imaged image in a case that the object is moved by the object moving means.

In the first invention, the three-dimensional image processing program is executed by a computer of a three-dimensional image processing apparatus (12) to output an imaged image obtained by imaging a three-dimensional virtual space with a virtual camera on a display (34). An operation input detecting means (40) detects an operation input from an input device (22). An object moving means (40) moves an object (106) within the three-dimensional virtual space or on the imaged image on the basis of the operation input detected by the operation input detecting means. A parameter setting means (40, S21, S22, S25) sets a gazing point and a position coordinate of the virtual camera on the basis of a position of the object within the three-dimensional virtual space or on the imaged image. A view volume deforming means (40, S25, S27) deforms a view volume of the virtual camera so as not to move a plane (gazing point plane) including the gazing point of the virtual camera and being in parallel with a projection plane of the imaged image in a case that the object is moved by the object moving means.

According to the first invention, the view volume is deformed without a plane including the gazing point and being in parallel with the projection plane of the imaged image being moved, and therefore, the gazing point and the vanishing point are overlapped with each other on the display screen. Thus, since the full-front in the three-dimensional virtual space is coincident with the full-front on the two-dimensional display screen, it is easily recognize the three-dimensional virtual space.

A second invention is storage medium storing a three-dimensional image processing program to be executed by a computer of a three-dimensional image processing apparatus to output an imaged image obtained by imaging a three-dimensional virtual space with a virtual camera on a display, the three-dimensional image processing program causes the computer of the three-dimensional image processing apparatus to function as: an operation input detecting means for detecting an operation input from an input device; an object moving means for moving an object within the three-dimensional virtual space or on the imaged image on the basis of the operation input detected by the operation input detecting means; a displacement amount detecting means for detecting an amount of displacement of the object with respect to a reference point set within the three-dimensional virtual space or on the imaged image; and a parameter setting means for setting, in a case that the amount of displacement detected by the displacement amount detecting means is not 0, a parameter of the virtual camera such that the amount of displacement is canceled out and the position of the object and a vanishing point in the three-dimensional virtual space are overlapped with each other, on the projection plane of the imaged image.

In the second invention, a three-dimensional image processing program is executed by a computer of a three-dimensional image processing apparatus (12) to output an imaged image obtained by imaging a three-dimensional virtual space with a virtual camera on a display (34). An operation input detecting means (40) detects an operation input from an input device (22). The object moving means (40) moves an object (106) within the three-dimensional virtual space or on the imaged image on the basis of the operation input detected by the operation input detecting means. A displacement amount detecting means (40, S11) detects an amount of displacement of the object with respect to a reference point set within the three-dimensional virtual space or on the imaged image. A parameter setting means (40, S23, S25, S27) sets, in a case that the amount of displacement detected by the displacement amount detecting means is not 0 ("NO" in S13), a parameter of the virtual camera such that the amount of displacement is canceled out and the position of the object and a vanishing point in the three-dimensional virtual space are overlapped with each other, on the projection plane of the imaged image.

According to the second invention, since a parameter of the virtual camera is set such that the amount of displacement of the object is cancelled out, and the position of the object and the vanishing point in the three-dimensional virtual space are overlapped with each other, on the projection plane of the imaged image, the full-front in the three-dimensional virtual space is coincident with the full-front on the two-dimensional display screen. Accordingly, it is possible to easily recognize the three-dimensional virtual space.

A third invention is according to the second invention, and the parameter set by the parameter setting means includes a position coordinate, a gazing point and a view volume of the virtual camera.

In the third invention, as a parameter, a position coordinate, a gazing point and a view volume of the virtual camera are included. For example, the gazing point of the virtual camera is set in accordance with the movement of the object, and the position of the virtual camera is decided by being translated with the movement. Then, the range of the view volume is set so as not to move the plane (gazing point plane) including the gazing point, and being in parallel with the projection plane of the imaged image.

According to the third invention, it is only necessary to set the position coordinate, gazing point and view volume of the virtual camera, and therefore, it is possible to display an easily viewable display screen with simple processing.

A fourth invention is according to any one of the first to third inventions, and the object is a two-dimensional object rendered on the projection plane of the imaged image.

In the fourth invention, the object is a two-dimensional object rendered on the projection plane of the imaged image. For example, the object may be a designation image like a cursor and a gun sight in a shooting game.

According to the fourth invention, it is possible to set the parameter of the virtual camera such that the position of the object and the vanishing point are overlapped with each other on the projection plane of the imaged image in accordance with the movement of the two-dimensional object on the projection plane of the imaged image.

A fifth invention is according to the first invention, and the object is a three-dimensional object within the three-dimensional virtual space, and a part of range of the three-dimensional virtual space including the three-dimensional object is projected onto the projection plane of the imaged image obtained by imaging with the virtual camera.

In the fifth invention, the object is a three-dimensional object existing in the three-dimensional virtual space. Accordingly, a part of range of the three-dimensional virtual space including the three-dimensional object is projected onto the projection plane of the imaged image obtained by imaging with the virtual camera. Thus, when the object moving means moves the object, a condition that the part of the three-dimensional virtual space including the objects projected onto the projection plane is displayed on the display screen.

According to the fifth invention, the gazing point and the position coordinate of the virtual camera can be set such that the position of the object and the vanishing point are overlapped with each other on the projection plane of the imaged image in accordance with the movement of the three-dimensional object within the three-dimensional space.

A sixth invention is according to the fifth invention, the three-dimensional image processing program causes the computer to function as a position transforming means for transforming the position of the object within the three-dimensional virtual space into a position on a plane in parallel with the projection plane of the imaged image in the three-dimensional virtual space, and the parameter setting means sets the gazing point and the position coordinate of the virtual camera on the basis of the position transformed by the position transforming means.

In the sixth invention, a position transforming means (40, S21) transforms the position within the three-dimensional virtual space into the position on the plane (gazing point plane) in parallel with the projection plane of the imaged image in the three-dimensional virtual space. A parameter setting means sets the gazing point and the position coordinate of the virtual camera on the basis of the position transformed by the position transforming means. Thus, the position coordinate of the virtual camera is also translated. That is, the virtual camera is moved such that the gazing point and the vanishing point are overlapped with each other.

According to the sixth invention, the position in the three-dimensional virtual space object is transformed into the position on the gazing point plane in the three-dimensional virtual space, and therefore, if the parameter of the virtual camera is set on the basis of the transformed position, the gazing point and the vanishing point are overlapped with each other on the projection plane of the imaged image, and that, it is possible to prevent the gazing point plane from being moved.

A seventh invention is according to the second or the third invention, and the object is a three-dimensional object within the three-dimensional virtual space, and is projected onto the projection plane of the imaged image obtained by imaging a part of the range of the three-dimensional virtual space including the three-dimensional object with the virtual camera.

In the seventh invention, the object is a three-dimensional object existing, in the three-dimensional virtual space. Accordingly, the three-dimensional object is projected onto the projection plane of the imaged image obtained by imaging a part of the range of the three-dimensional virtual space including the three-dimensional object with the virtual camera. Thus, when an object is moved by the object moving means, a situation that a part of the three-dimensional virtual space including the object is projected on the projection plane is displayed on the display screen.

According to the seventh invention, the parameter of the virtual camera can be set such that the position of the object and the vanishing point are overlapped with each other on the projection plane of the imaged image in accordance with the movement of the three-dimensional object within the three-dimensional space.

An eighth invention is according to the seventh invention, and the three-dimensional image processing program causes the computer to further function as a displacement amount transforming means for transforming the amount of displacement of the object with respect to the reference point set within the three-dimensional virtual space which is detected by the displacement amount detecting means into an amount of displacement on a plane in parallel with the projection plane of the imaged image in the three-dimensional virtual space, and the parameter setting means sets, in a case that the amount of displacement transformed by the displacement amount transforming means is not 0, the parameter of the virtual camera so as to cancel out the amount of displacement.

In the eighth invention, a displacement amount transforming means (40, S21) transforms the amount of displacement of the object with respect to the reference point set within the three-dimensional virtual space which is detected by the displacement amount detecting means into an amount of displacement on a plane in parallel with the projection plane of the imaged image in the three-dimensional virtual space. The parameter setting means sets, in a case that the amount of displacement transformed by the displacement amount transforming means is not 0 ("NO" in S13), the parameter of the virtual camera so as to cancel out the amount of displacement.

According to the eighth invention, the parameter of the virtual camera is set such that the amount of displacement of the object in the three-dimensional virtual space object is canceled out, and therefore, the full-front in the three-dimensional virtual space is coincident with the full-front on the two-dimensional display screen. Accordingly, it is possible to display an easily viewable screen.

A ninth invention is according to any one of the first to the third inventions, and the parameter setting means sets the position coordinate of the virtual camera on the basis of a gazing point and an orientation of the virtual camera, and a distance between the gazing point and the virtual camera.

In the ninth invention, the parameter setting means sets the position coordinate of the virtual camera by one calculation processing on the basis of a gazing point and an orientation of the virtual camera, and a distance between the gazing point and the virtual camera.

According to the ninth invention, the position coordinate of the virtual camera is set by one calculation processing, and therefore, it is possible to reduce the load on the calculation processing.

A tenth invention is according to any one of the first to third inventions, and the parameter setting means sets the position coordinate of the virtual camera by translating a preceding position coordinate of the virtual camera in accordance with the movement of the gazing point of the virtual camera.

In the tenth invention, the parameter setting means calculates the position coordinate of the virtual camera by previously calculating the preceding position coordinate of the virtual camera, and then translating the calculated position coordinate of the virtual camera in accordance with the movement of the gazing point of the virtual camera.

According to the tenth invention, the position coordinate of the virtual camera is previously calculated, and therefore the calculation need to be executed twice, but similar to the case of the gazing point of the virtual camera, it is only necessary to perform translating, so that the calculation itself is simple.

An eleventh invention is according to any one of the first to the tenth inventions, and the input device is a pointing device, and the object moving means moves the object to the position coordinate designated with the pointing device on the projection plane of the imaged image.

In the eleventh invention, the input device is a pointing device (22) for moving the object to the position coordinate designated with the pointing device on the projection plane of the imaged image.

According to the eleventh invention, the object can be moved with the pointing device, capable of intuitively and simply performing an operation.

A twelfth invention is a three-dimensional image processing apparatus to output an imaged image obtained by imaging a three-dimensional virtual space with a virtual camera on a display, comprises: an operation input detecting means for detecting an operation input from an input device; an object moving means for moving an object within the three-dimensional virtual space or on the imaged image on the basis of the operation input detected by the operation input detecting means; a parameter setting means for setting a gazing point and a position coordinate of the virtual camera on the basis of a position of the object within the three-dimensional virtual space or on the imaged image; and a view volume deforming means for deforming a view volume of the virtual camera so as not to move a plane including the gazing point of the virtual camera and being in parallel with a projection plane of the imaged image in a case that the object is moved by the object moving means.

In the twelfth invention also, similar to the first invention, it is possible to easily recognize the three-dimensional virtual space.

A thirteenth invention is a three-dimensional image processing apparatus to output an imaged image obtained by imaging a three-dimensional virtual space with a virtual camera on a display, comprises: an operation input detecting means for detecting an operation input from an input device; an object moving means for moving an object within the three-dimensional virtual space or on the imaged image on the basis of the operation input detected by the operation input detecting means; a displacement amount detecting means for detecting an amount of displacement of the object with respect to a reference point set within the three-dimensional virtual space or on the imaged image; and a parameter setting means for setting, in a case that the amount of displacement detected by the displacement amount detecting means is not 0, a parameter of the virtual camera such that the amount of displacement is canceled out, and the position of the object and a vanishing point in the three-dimensional virtual space are overlapped with each other, on the projection plane of the imaged image.

In the thirteenth invention also, similar to the second invention, it is possible to easily recognize the three-dimensional virtual space.

A fourteenth invention is a three-dimensional image processing method to output an imaged image obtained by imaging a three-dimensional virtual space with a virtual camera on a display, including following steps of: (a) detecting an operation input from an input device; (b) moving an object within the three-dimensional virtual space or on the imaged image on the basis of the operation input detected by the step (a); (c) setting a gazing point and a position coordinate of the virtual camera on the basis of a position of the object within the three-dimensional virtual space or on the imaged image; and (d) deforming a view volume of the virtual camera so as not to move a plane including the gazing point of the virtual camera and being in parallel with a projection plane of the imaged image in a case that the object is moved by the step (b).

In the fourteenth invention also, similar to the first invention, it is possible to easily recognize the three-dimensional virtual space.

A fifteenth invention is a three-dimensional image processing method to output an imaged image obtained by imaging a three-dimensional virtual space with a virtual camera on a display, including following step of, (a) detecting an operation input from an input device; (b) moving an object within the three-dimensional virtual space or on the imaged image on the basis of the operation input detected by the step (a); (c) detecting an amount of displacement of the object with respect to a reference point set within the three-dimensional virtual space or on the imaged image; and (d) setting, in a case that the amount of displacement detected by the step (c) is not 0, a parameter of the virtual camera such that the amount of displacement is canceled out, and the position of the object and a vanishing point in the three-dimensional virtual space are overlapped with each other, on the projection plane of the imaged image.

In the fifteenth invention also, similar to the second invention, it is possible to easily recognize the three-dimensional virtual space.

The above described features, aspects and advantages of example embodiments of the present invention will become more apparent from the following detailed description of the present invention when taken in conjunction with the accompanying drawings.

BRIEF DESCRIPTION OF THE DRAWINGS

FIG. 9 is an illustrative view for explaining a cone (view volume) in the three-dimensional virtual space;

FIG. 10 is an illustrative view for explaining translating and deformation of the cone (view volume) in the three-dimensional virtual space;

FIG. 11 is an illustrative view for explaining translating and deformation of the cone (view volume) in the three-dimensional virtual space;

DETAILED DESCRIPTION OF THE EXAMPLE EMBODIMENTS

Figure 1:
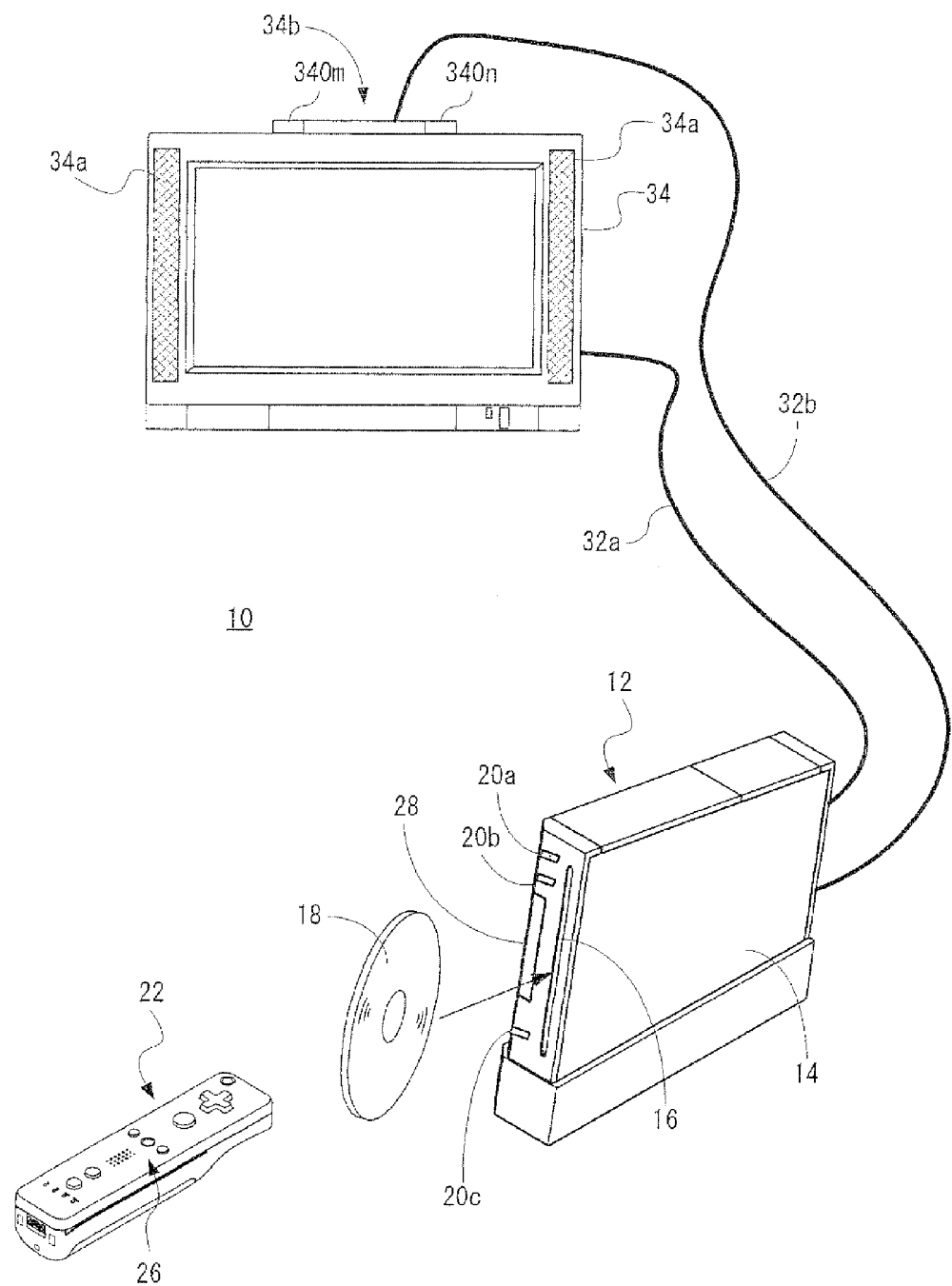
FIG. 1 is an illustrative view showing one embodiment of a game system of the present invention.

Referring to FIG. 1, a game system 10 of one embodiment of the present invention includes a video game apparatus (hereinafter referred to as "game apparatus") 12 functioning as a three-dimensional image processing apparatus and a controller 22. Although illustration is omitted, the game apparatus 12 of this embodiment is designed such that it can be connected to four controllers 22 at the maximum. Furthermore, the game apparatus 12 and the respective controllers 22 are connected by a wireless manner. The wireless communication is executed according to a Bluetooth (registered trademark) standard, for example, but may be executed by other standards, such as infrared rays, a wireless LAN. In addition, it may be connected by a wire.

The game apparatus 12 includes a roughly rectangular parallelepiped housing 14, and the housing 14 is furnished with a disk slot 16 on a front face. An optical disk 18 storing game program, etc. as one example of an information storage medium is inserted through the disk slot 16 to be loaded into a disk drive 54 (see FIG. 2) within the housing 14. Although illustration is omitted, around the disk slot 16, an LED and a light guide plate are arranged such that the LED of the disk slot 16 can light on or off in accordance with various processing.

Furthermore, on the upper front face of the housing 14 of the game apparatus 12, a power button 20a and a reset button 20b are provided, and an eject button 20c is provided below them. In addition, a connector cover for external memory card 28 is provided between the reset button 20b and the eject button 20c, and in the vicinity of the disk slot 16. Inside the connector cover for external memory card 28, a connector for external memory card 62 (see FIG. 2) is provided, through which an external memory card (hereinafter simply referred to as a "memory card") not shown is inserted. The memory card is employed for loading the game program, etc. read from the optical disk 18 to temporarily store it, storing (saving) game data (result data or proceeding data of the game) of the game played by means of the game system 10, and so forth. It should be noted that storing the game data described above may be performed on an internal memory, such as a flash memory 44 (see FIG. 2) inside the game apparatus 12 in place of the memory card. Also, the memory card may be utilized as a backup memory for the internal memory. In addition, in the game apparatus 12, other applications except for the game may be executed, and in such a case, data of the other applications can be stored in the memory card.

Here, a general-purpose SD card can be employed as a memory card, but other general-purpose memory cards, such as memory sticks, a multimedia card (registered trademark) can be employed.

Although omitted in FIG. 1, the game apparatus 12 has an AV cable connector 58 (FIG. 2) on the back face of the housing 14, and by utilizing the AV cable connector 58, a monitor 34 and a speaker 34a are connected to the game apparatus 12 through an AV cable 32a. The monitor 34 and the speaker 34a are typically a color television receiver, and through the AV cable 32a, a video signal from the game apparatus 12 is input to a video input terminal of the color television, and a sound signal from the game apparatus 12 is input to a sound input terminal. Accordingly, a game image of a three-dimensional (3D) video game, for example, is displayed on the screen of the color television (monitor) 34, and stereo game sound, such as a game music, a sound effect, etc. is output from the right and left speakers 34a. Around the monitor 34 (on the top side of the monitor 34, in this embodiment), a marker unit 34b inciting two infrared ray LEDs (markers) 340m and 340n is provided. The marker unit 34h is connected to the game apparatus 12 through a power source cable 32b. Accordingly, the marker unit 34b is supplied with power from the game apparatus 12. Thus, the markers 340m and 340n emit lights ahead of the monitor 34.

Furthermore, the power of the game apparatus 12 is applied by means of a general AC adapter (not illustrated). The AC adapter is inserted into a standard wall socket for home use, and the game apparatus 12 transforms the house current (commercial power supply) to a low DC voltage signal suitable for driving. In another embodiment, a battery may be utilized as a power supply.

In the game system 10, a user or a player turns the power of the game apparatus 12 on for playing the game (or applications other than the game). Then, the user selects an appropriate optical disk 18 storing a program of a video game (or other applications the player wants to play), and loads the optical disk 18 into the disk drive 54 of the game apparatus 12. In response thereto, the game apparatus 12 starts to execute a video game or other applications on the basis of the program recorded in the optical disk 18. The user operates the controller 22 in order to apply an input to the game apparatus 12. For example, by operating any one of the input means 26, a game or other application is started. Besides the operation of the input means 26, by moving the controller 22 itself, it is possible to move a moving image object (player object) in different directions or change a perspective of the user (camera position) in a 3-dimensional game world.

Here, programs of the video game and other applications may be stored (installed) in an internal memory (flash memory 42 (see FIG. 2)) of the game apparatus 12 so as to be executed from the internal memory. In such a case, programs stored in a storage medium like an optical disk 18 may be installed onto the internal memory, or downloaded programs may be installed onto the internal memory.

Figure 2:
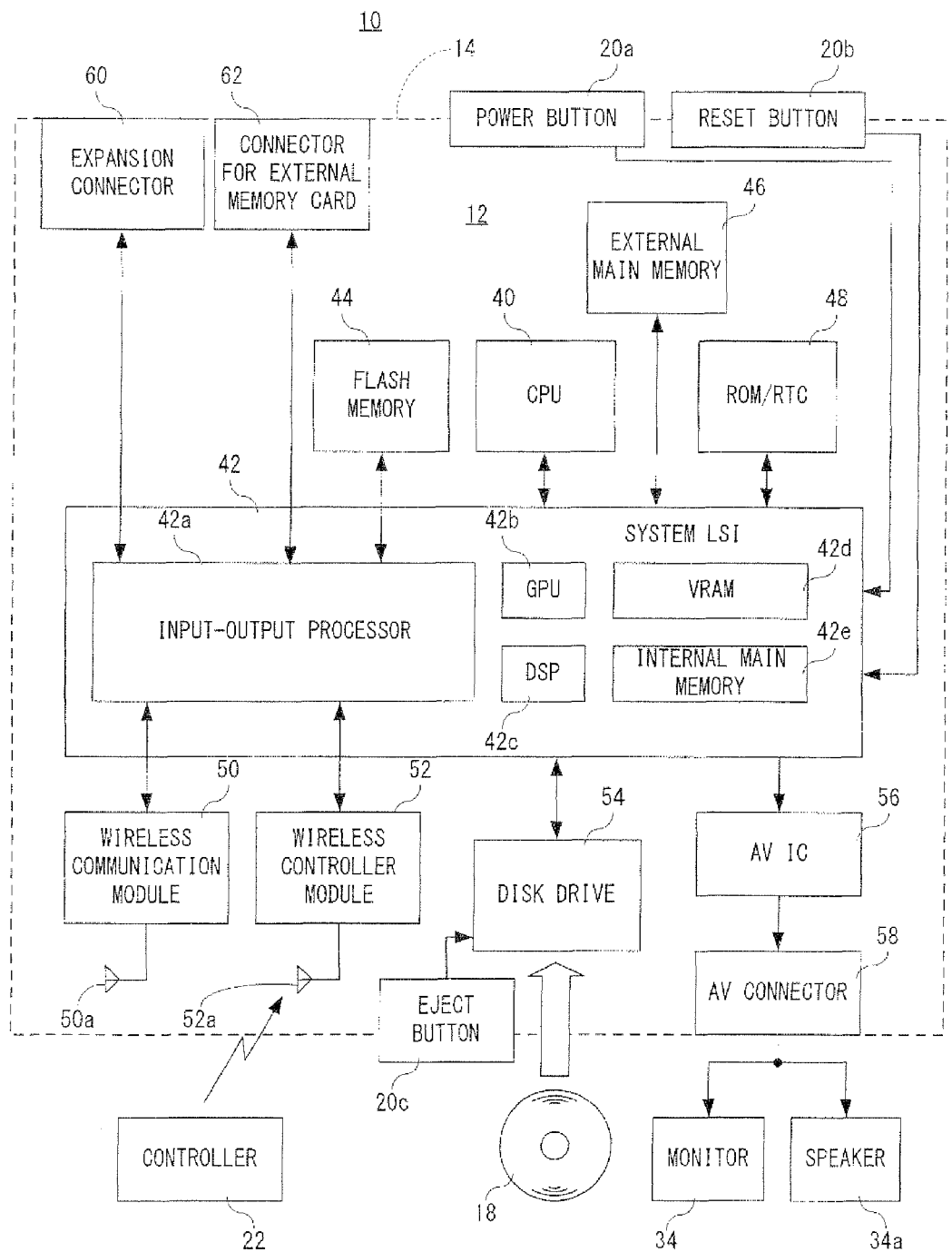
FIG. 2 is a block diagram showing an electric configuration of the game system shown in FIG. 1.

FIG. 2 is a block diagram showing an electric configuration of the video game system 10 in FIG. 1 embodiment. Although illustration is omitted, the respective components within the housing 14 are mounted on a printed board. As shown in FIG. 2, the game apparatus 12 has a CPU 40 functioning as a game processor. The CPU 40 is connected with a system LSI 42. The system LSI 42 is connected with an external main memory 46, a ROM/RTC 48, a disk drive 54, and an AV IC 56.

The external main memory 46 is utilized as a work area or a buffer area of the CPU 40 by storing programs like a game program, etc., and various data. The ROM/RTC 48, a so-called boot ROM, is incorporated with a program for activating the game apparatus 12, and provided with a time circuit for counting a time. The disk drive 54 reads a program, image data, sound data, etc. from the optical disk 18, and writes them in an internal main memory 42e described later or the external main memory 46 under the control of the CPU 40.

The system LSI 42 is provided with an input-output processor 42a, a GPU (Graphics Processor Unit) 42b, a DSP (Digital Signal Processor) 42c, a VRAM 42d, and an internal main memory 42e. Although illustration is omitted, these are connected with each other by internal buses. The input-output processor (I/O processor) 42a executes transmission and reception of data, downloads of data, and so forth. A detailed description is made later as to transmission and reception and download of the data.

The GPU 42b is made up of a part of a rendering means, and receives a graphics command (construction command) from the CPU 40 to generate game image data according to the command. Additionally, the CPU 40 applies an image generating program required for generating game image data to the GPU 42b in addition to the graphics command.

Although illustration is omitted, the CPU 42b is connected with the VRAM 42d as described above. The GPU 42b accesses the VRAM 42d to acquire the data (image data: data such as polygon data, texture data, etc.) required to execute the construction command. Additionally, the CPU 40 writes the image data required for drawing to the VRAM 42d via the GPU 42b. The GPU 42b accesses the VRAM 42d to create game image data for drawing.

In this embodiment, a description is made on a case that the GPU 42b generates game image data, but in a case of executing an arbitrary application except for the game application, the GPU 425 generates image data as to the arbitrary application.

Furthermore, the DSP 42c functions as an audio processor, and generates audio data corresponding to a sound, a voice, music, or the like by means of the sound data and the sound wave (tone) data which are stored in the internal main memory 42e and the external main memory 46.

The game image data and audio data which are generated as described above are read by the AV IC 56, and output to the monitor 34 and the speaker 34a via the AV connector 59. Accordingly, a game screen is displayed on the monitor 34, and a sound (music) necessary for the game is output from the speaker 34a.

Furthermore, the input-output processor 42a is connected with a flash memory 44, a wireless communication module 50, a wireless controller module 52, an expansion connector 60 and a connector for external memory card 62. The wireless communication module 50 is connected with an antenna 50a, and the wireless controller module 52 is connected with an antenna 52a.

Although illustration is omitted, the input-output processor 42a can communicate with other game apparatuses and various servers to be connected to a network via the wireless communication module 50. It should be noted that it is possible to directly communicate with other game apparatuses without going through the network. The input-output processor 42a periodically accesses the flash memory 44 to detect the presence or absence of data (referred to as transmission data) required to be transmitted to a network, and in a case that the transmission data is present, transmits it to the network via the wireless communication module 50 and the antenna 50a. Furthermore, the input-output processor 42a receives data (referred to as reception data) transmitted from other game apparatuses via the network, the antenna 50a and the wireless communication module 50, and stores the reception data in the flash memory 44. If the reception data does not satisfy a predetermined condition, the reception data is abandoned as it is. In addition, the input-output processor 42a receives data (download data) downloaded from the download server via the network, the antenna 50a and the wireless communication module 50, and stores the download data in the flash memory 44.

Furthermore, the input-output processor 42a receives input data transmitted from the controller 22 via the antenna 52a and the wireless controller module 52, and (temporarily) stores it in the buffer area of the internal main memory 42c or the external main memory 46. The input data is erased from the buffer area after being utilized in the processing by the CPU 40 (game processing, for example).

In this embodiment, as described above, the wireless controller module 52 performs a communication with the controller 22 in accordance with Bluetooth standards.

In addition, the input-output processor 42a is connected with the expansion connector 60 and the connector for external memory card 62. The expansion connector 60 is a connector for interfaces, such as USB, SCSI, etc., and can be connected with medium such as an external storage, and peripheral devices such as another controller different from the controller 22. Furthermore, the expansion connector 60 is connected with a cable LAN adaptor, allowing the cable LAN to be used in place of the wireless communication module 50. The connector for external memory card 62 can be connected with an external storage like a memory card. Thus, for example, the input-output processor 42a accesses the external storage via the expansion connector 60 and the connector for external memory card 62 to store and read the data.

Although a detailed description is omitted, as shown in FIG. 1, the game apparatus 12 (housing 14) is furnished with the power button 20a, the reset button 20b, and the eject button 20c. The power button 20a is connected to the system LSI 42. When the power button 20a is turned on, the system LSI 42 is set to a mode of a normal energized state in which the respective components of the game apparatus 12 are supplied with power through an AC adapter not shown (referred to as "normal mode"). On the other hand, when the power button 20a is turned off, the system LSI 42 is set to a mode in which only apart of the components of the game apparatus 12 is supplied with power, and the power consumption is reduced to minimum (hereinafter referred to as a "standby mode").

In this embodiment, in a case that the standby mode is set, the system LSI 42 issues an instruction to stop supplying the power to the components except for the input-output processor 42a, the flash memory 44, the external main memory 46, the ROM/RTC 4S, the wireless communication module 50, and the wireless controller module 52. Accordingly, in this embodiment, in the standby mode, the CPU 40 never performs an application.

Although the system LSI 42 is supplied with power even in the standby mode, generation of clocks to the GPU 42b, the DSP42c and the VRAM 42d are stopped so as not to be driven, realizing reduction in power consumption.

Although illustration is omitted, inside the housing 14 of the game apparatus 12, a fan is provided for excluding heat of the IC, such as the CPU 40, the system LSI 42, etc. to outside. In the standby mode, the fan is also stopped.

However, in a case that utilizing the standby mode is not desired, by making the standby mode unusable, when the power button 20a is turned off, the power supply to all the circuit components are completely stopped.

Furthermore, switching between the normal mode and the standby mode can be performed by turning on and off the power switch 26h of the controller 22 by remote control. If the remote control is not performed, setting is made such that the power supply to the wireless controller module 52a is not performed in the standby mode.

The reset button 20b is also connected to the system LSI 42. When the reset button 20b is pushed, the system LSI 42 restarts the activation program of the game apparatus 12. The eject button 20c is connected to the disk drive 54. When the eject buttons 20c is pushed, the optical disk 18 is removed from the disk drive 54.

FIG. 3(A) to FIG. 3(E) show one example of an external appearance of the controller 22. FIG. 3(A) shows a leading end surface of the controller 22, FIG. 3(B) shows a top surface of the controller 22, FIG. 3(C) shows a right side surface of the controller 22, FIG. 3(D) shows a bottom surface of the controller 22, and FIG. 3(E) shows a trailing end surface of the controller 22.

Referring to FIG. 3(A) to FIG. 3(E), the controller 22 has a housing 22a formed by plastic molding, for example. The housing 22a is formed into an approximately rectangular parallelepiped shape and has a size small enough to be held by one hand of a user. The housing 22a (controller 22) is provided with the input means (a plurality of buttons or switches) 26. Specifically, as shown in FIG. 3(B), on the top surface of the housing 22a, there are provided a cross key 26a, a 1 button 26b, a 2 button 26c, an A button 26d, a − button 26e, a HOME button 26f, a + button 26g and a power switch 26h. Moreover, as shown in FIG. 3(C) and FIG. 3(D), an inclined surface is formed on a bottom surface of the housing 22a, and a B-trigger switch 26i is formed on the inclined surface.

The cross key 26a is a four directional push switch, including four directions of front (or upper), back (or lower), right and left operation parts. By operating any one of the operation parts, it is possible to instruct a moving direction of a character or an object (player character or player object) that is operable by a player, instruct the moving direction of a cursor, or merely instruct the direction.

The 1 button 20b and the 2 button 26c are respectively push button switches. They are used for a game operation, such as adjusting a viewpoint position and a viewpoint direction in displaying the 3D game image, i.e. a position and an image angle of a virtual camera. Alternatively, the 1 button 26b and the 2 button 26c can be used for the same operation as that of the A-button 26d and the B-trigger switch 26i or an auxiliary operation.

The A-button switch 26d is the push button switch, and is used for causing the player character or the player object to take an action other than a directional instruction, specifically arbitrary actions, such as hitting (punching), throwing, grasping (acquiring), riding, and jumping, etc. For example, in an action game, it is possible to give an instruction to jump, punch, move a weapon, and so forth. Also, in a roll playing game (RPG) and a simulation RPG, it is possible to instruct to acquire an item, select and determine the weapon and command, and so forth. Furthermore, in a case that the controller 22 is used as a pointing device, the A-button switch 26d is used to instruct a decision of an icon or a button image designated by a pointer (designation image) on the game screen. For example, when the icon or the button image is decided, an instruction (command) set in advance corresponding thereto can be input.

The − button 26e, the HOME button 26f, the + button 26g, and the power supply switch 26h are also push button switches. The − button 26c is used for selecting a game mode. The HOME button 26f is used for displaying a game menu (menu screen). The + button 26g is used for starting (resuming) or pausing the game. The power supply switch 26h is used for turning on/off a power supply of the game apparatus 12 by remote control.

In this embodiment, note that the power supply switch for turning on/off the controller 22 itself is not provided, and the controller 22 is set at on-state by operating any one of the switches or buttons of the input means 26 of the controller 22, and when not operated for a certain period of time (30 seconds, for example) or more, the controller 22 is automatically set at off-state.

The B-trigger switch 26i is also the push button switch, and is mainly used for inputting a trigger, such as shooting, and designating a position selected by the controller 22. In a case that the B-trigger switch 26i is continued to be pushed, it is possible to make movements and parameters of the player object constant. In a fixed case, the B-trigger switch 26i functions in the same way as a normal state, and is used for canceling the action and the command determined by the A-button 26d.

As shown in FIG. 3(E), an external expansion connector 22b is provided on a trailing end surface of the housing 22a, and as shown in FIG. 3(B), an indicator 22c is provided on the top surface and on the side of the trailing end surface of the housing 22a. The external expansion connector 22b is utilized for connecting another expansion controller not shown other than the controller 22. The indicator 22c is made up of four LEDs, for example. The indicator 22c can show identification information (controller number) of the controller 22 by lighting any one of the four LEDs and according to the lighted LED, and show the remaining amount of the battery of the controller 22 depending on the number of LEDs to be emitted.

In addition, the controller 22 has an imaged information arithmetic section 80 (see FIG. 4), and as shown in FIG. 3(A), a light incident opening 22d of the imaged information arithmetic section 80 is provided on the leading end surface of the housing 22a. Furthermore, the controller 22 has a speaker 86 (see FIG. 4), and the speaker 86 is provided inside the housing 22a at the position corresponding to a sound release hole 22e between the 1 button 26b and the HOME button 26f on the top surface of the housing 22a as shown in FIG. 3(B).

Note that the shape of the controller 22 and the shape, number and setting position of each input means 26 shown in FIG. 3(A) to FIG. 3(E) are simply examples, and needless to say, even if they are suitably modified, example embodiments of the present invention can be implemented.

Figure 4:
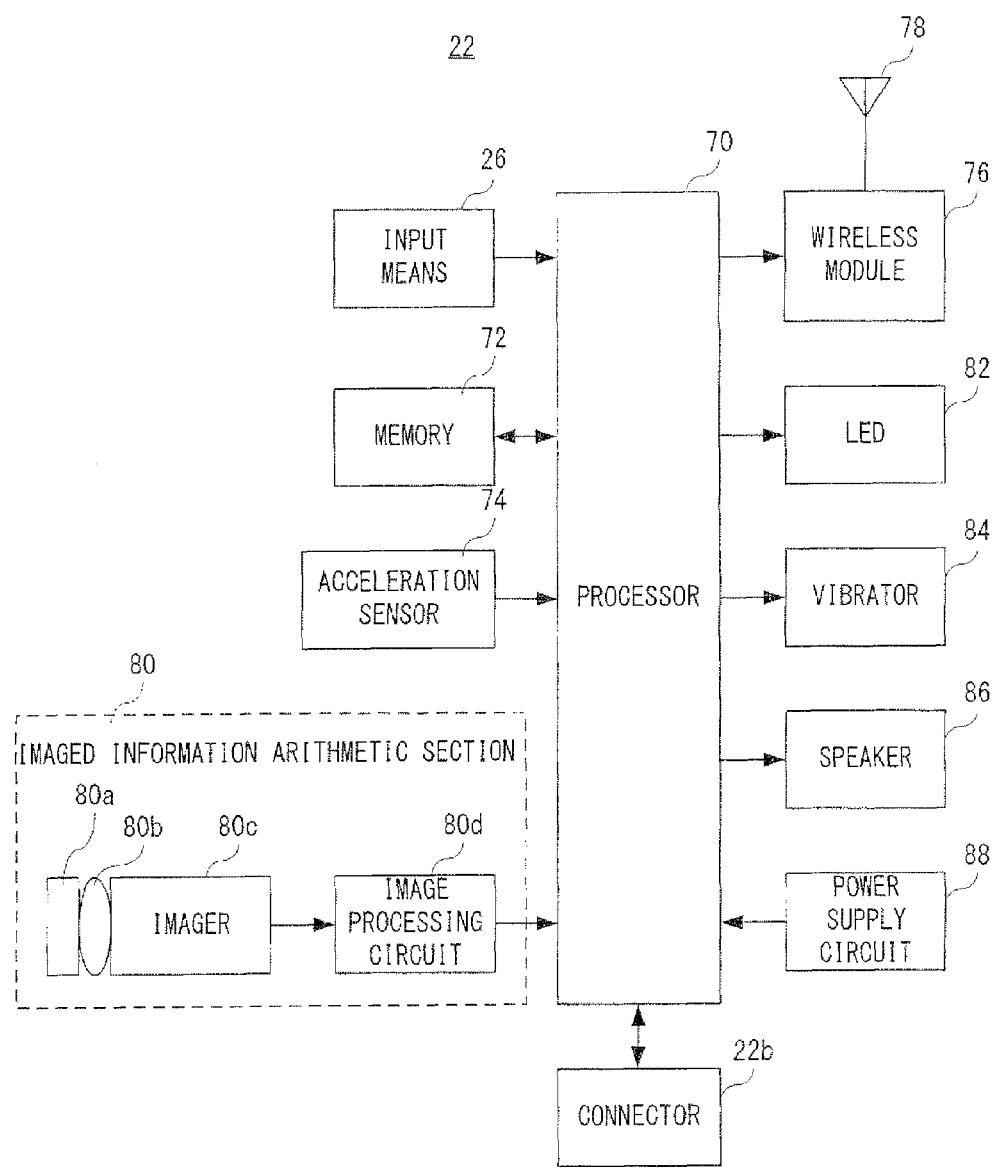
FIG. 4 is a block diagram showing an electric configuration of the controller shown in FIG. 3.

FIG. 4 is a block diagram showing an electric configuration of the controller 22. Referring to FIG. 4, the controller 22 includes a processor 70, and the processor 70 is connected with the external expansion connector 22b, the input means 26, a memory 72, an acceleration sensor 74, a wireless module 76, the imaged information arithmetic section 80, an LED 82 (the indicator 22c), a vibrator 84, a speaker 86, and a power supply circuit 88 by an internal bus (not shown). Moreover, an antenna 78 is connected to the wireless module 76.

For simplicity, although omitted in FIG. 4, the indicator 22c is made up of the four LEDs 82 as described above.

The processor 70 is in charge of an overall control of the controller 22, and transmits (inputs) information (input information) input by the input means 26, the acceleration sensor 74, and the imaged information arithmetic section 80 as input data to the game apparatus 12 via the wireless module 76 and the antenna 78. At this time, the processor 70 uses the memory 72 as a working area or a buffer area. An operation signal (operation data) from the aforementioned input means 26 (26a to 26i) is input to the processor 70, and the processor 70 stores the operation data once in the memory 72.

Moreover, the acceleration sensor 74 detects each acceleration of the controller 22 in directions of three axes of vertical direction (y-axial direction), lateral direction (x-axial direction), and forward and rearward directions (z-axial direction). The acceleration sensor 74 is typically an acceleration sensor of an electrostatic capacity type, but the acceleration sensor of other type may also be used.

For example, the acceleration sensor 74 detects the accelerations (ax, ay, and az) in each direction of x-axis, y-axis, z-axis for each first predetermined time, and inputs the data of the acceleration (acceleration data) thus detected to the processor 70. For example, the acceleration sensor 74 detects the acceleration in each direction of the axes in a range from −2.0 g to 2.0 g (g indicates a gravitational acceleration. The same thing can be the hereafter.) The processor 70 detects the acceleration data given from the acceleration sensor 74 for each second predetermined time, and stores it in the memory 72 once.

The processor 70 creates input data including at least one of the operation data, the acceleration data and marker coordinate data as described later, and transmits the input data thus created to the game apparatus 12 for each third predetermined time (5 msec, for example).

Figure 3:
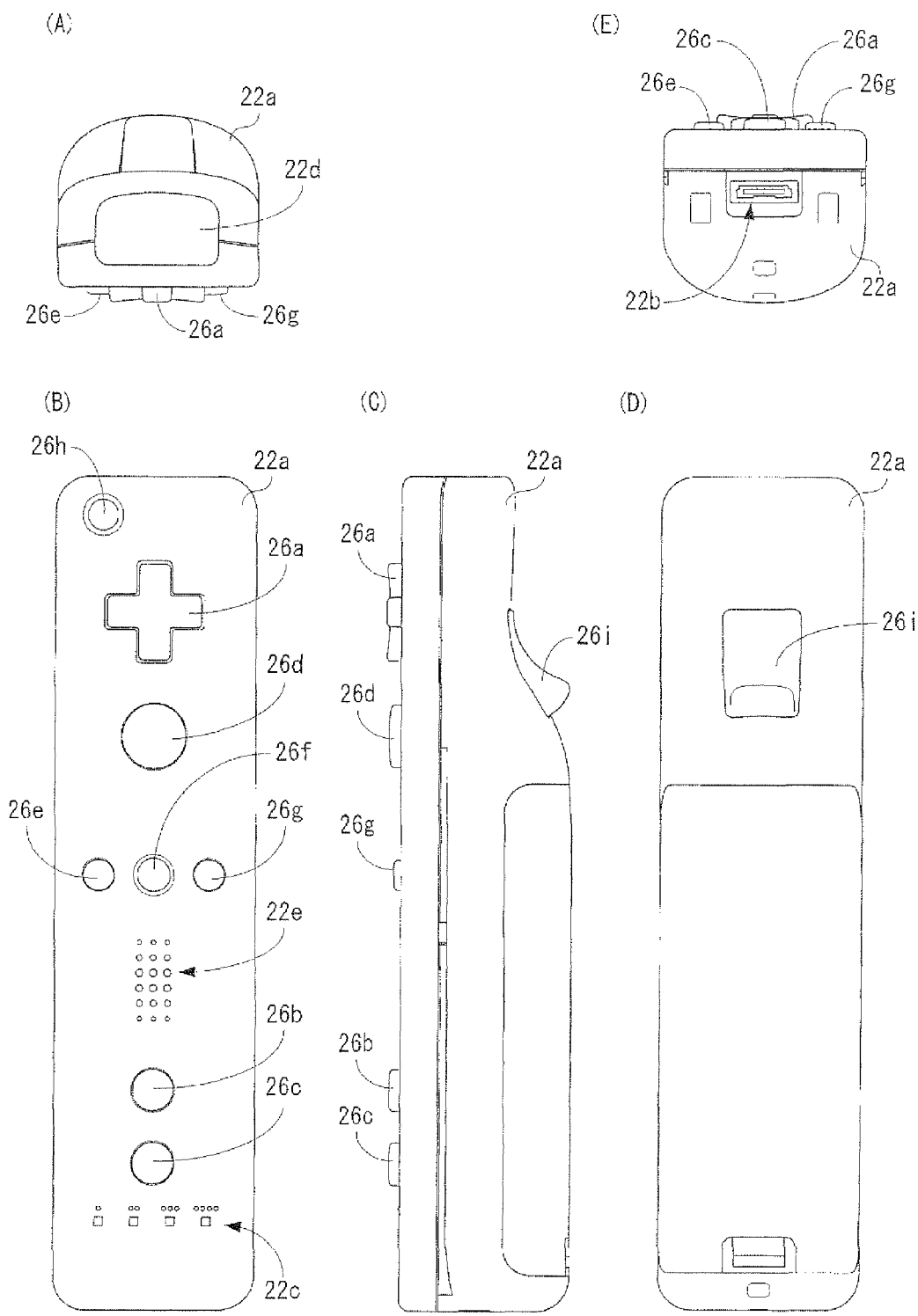
FIG. 3 is an illustrative view showing an appearance of a controller shown in FIG. 1.

In this embodiment, although omitted in FIG. 3 (A) to FIG. 3 (E), the acceleration sensor 74 is provided inside the housing 22a on the circuit board in the vicinity of where the cross key 26a is arranged.

The wireless module 76 modulates a carrier of a predetermined frequency by the input data, by using a technique of Bluetooth, for example, and emits its weak radio wave signal from the antenna 78. Namely, the input data is modulated to the weak radio wave signal by the wireless module 76 and transmitted from the antenna 78 (controller 22). The weak radio wave signal thus transmitted is received by the wireless controller module 52 provided to the aforementioned game apparatus 12. The weak radio wave thus received is subjected to demodulating and decoding processing. This makes it possible for the game apparatus 12 (CPU 40) to acquire the input data from the controller 22. Then, the CPU 40 performs processing of the application (game processing), following the acquired input data and the application program (game program).

In addition, as described above, the controller 22 is provided with the imaged information arithmetic section 80. The imaged information arithmetic section 80 is made up of an infrared rays filter 80a, a lens 80b, an imager 80c, and an image processing circuit 80d. The infrared rays filter 80a passes only infrared rays from the light incident from the front of the controller 22. As described above, the markers 340m and 340n placed near (around) the display screen of the monitor 34 are infrared LEDs for outputting infrared lights ahead of the monitor 34. Accordingly, by providing the infrared rays filter 80a, it is possible to image the image of the markers 340m and 340n more accurately. The lens 80b condenses the infrared rays passing thorough the infrared rays filter 80a to emit them to the imager 80c. The imager 80c is a solid imager, such as a CMOS sensor and a CCD, for example, and images the infrared rays condensed by the lens 80b. Accordingly, the imager 80c images only the infrared rays passing through the infrared rays filter 80a to generate image data. Hereafter, the image imaged by the imager 80c is called an "imaged image". The image data generated by the imager 80c is processed by the image processing circuit 80d. The image processing circuit 80d calculates a position of an object to be imaged (markers 340m and 340n) within the imaged image, and outputs each coordinate value indicative of the position to the processor 70 as imaged data (marker coordinate data to be described later) for each fourth predetermined time. It should be noted that a description of the process in the image processing circuit 80d is made later.

Figure 5:
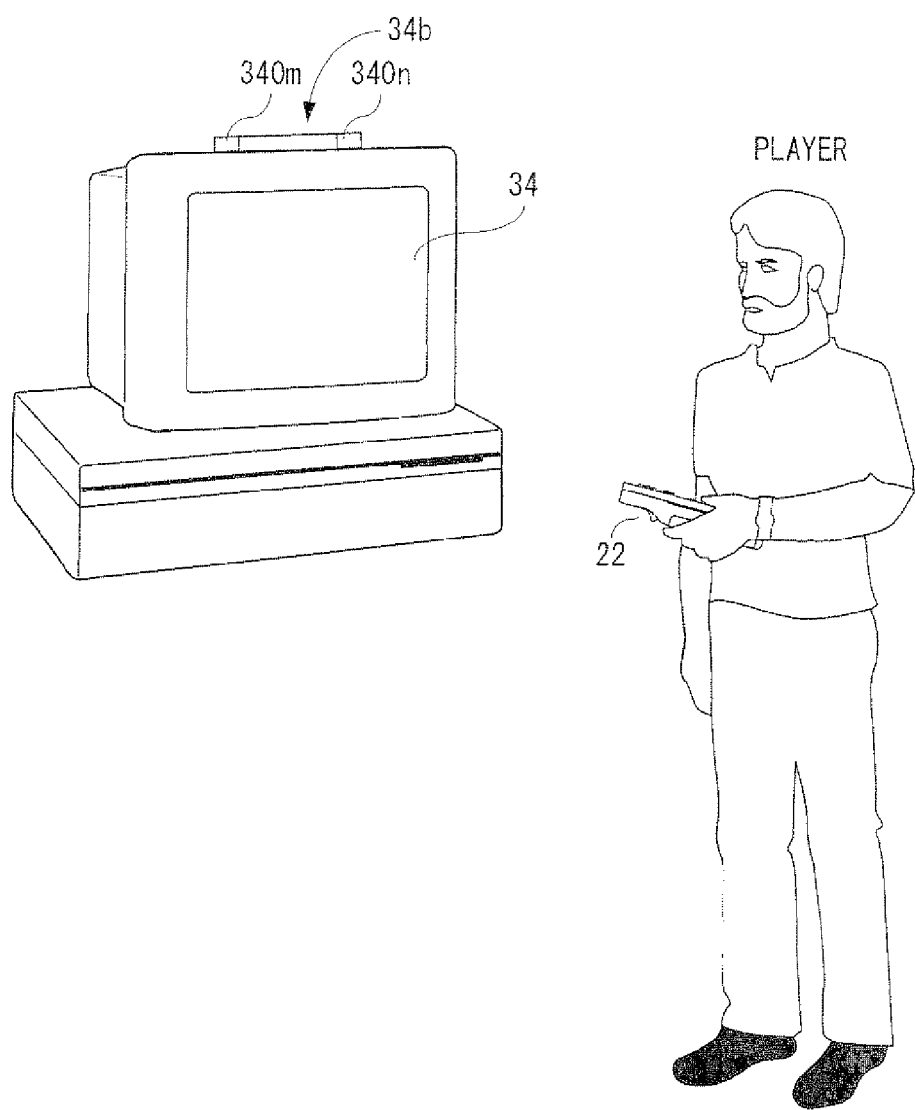
FIG. 5 is an illustrative view roughly explaining a situation when a game is played by means of the controller shown in FIG. 1.

FIG. 5 is an illustrative view summarizing a state when a player plays a game by utilizing the controller 22. It should be noted that the same is true for a case that another application is executed as well as a game playing. As shown in FIG. 5, when playing the game by means of the controller 22 in the video game system 10, the player holds the controller 22 with one hand. Strictly speaking, the player holds the controller 22 in a state that the front end surface (the side of the incident light opening 22d of the light imaged by the imaged information arithmetic section 80) of the controller 22 is oriented to the markers 340m and 340n. It should be noted that as can be understood from FIG. 1, the markers 340m and 340n are placed in parallel with the horizontal direction of the screen of the monitor 34. In this state, the player performs a game operation by changing a position on the screen designated by the controller 22, and changing a distance between the controller 22 and each of the markers 340m and 340n.

Figure 6:
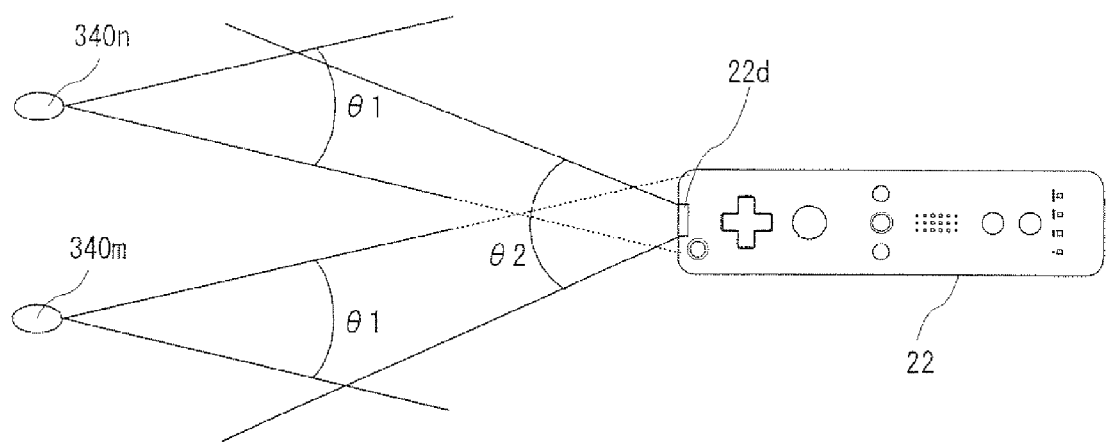
FIG. 6 is an illustrative view explaining viewing angles of markers and the controller shown in FIG. 1.

FIG. 6 is a view showing viewing angles between the respective markers 340m and 340n, and the controller 22. As shown in FIG. 6, each of the markers 340m and 340n emits infrared ray within a range of a viewing angle θ1. Also, the imager 80c of the imaged information arithmetic section 80 can receive incident light within the range of the viewing angle θ2 taking the line of sight of the controller 22 as a center. For example, the viewing angle θ1 of each of the markers 340m and 340n is 34° (half-value angle) while the viewing angle θ2 of the imager 80c is 41°. The player holds the controller 22 such that the imager 80c is directed and positioned so as to receive the infrared rays from the markers 340m and 340n. More specifically, the player holds the controller 22 such that at least one of the markers 340m and 340n exists in the viewing angle θ2 of the imager 80c, and the controller 22 exists in at least one of the viewing angles θ1 of the marker 340m or 340n. In this state: the controller 22 can detect at least one of the marker-s 340m and 340n. The player can perform a game operation by changing the position and the attitude of the controller 22 in the range satisfying the state.

If the position and the attitude of the controller 22 are out of the range, the game operation based on the position and the attitude of the controller 22 cannot be performed. Hereafter the above-described range is called an "operable range".

Figure 7:
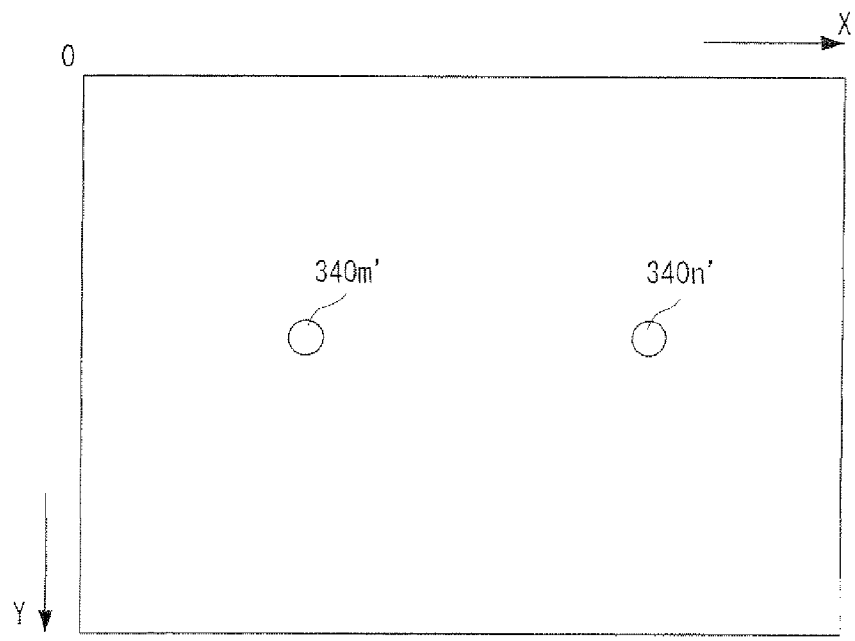
FIG. 7 is an illustrative view showing one example of the imaged images including object images.

If the controller 22 is held within the operable range: an image of each of the markers 340m and 340n is imaged by the imaged information arithmetic section 80. That is, the imaged image obtained by the imager 80c includes an image (object image) of each of the markers 340m and 340n as an object to be imaged. FIG. 7 is an illustrative view showing one example of the imaged image including the object images. The image processing circuit 80d calculates coordinates (marker coordinates) indicative of the position of each of the markers 340m and 340n in the imaged image by utilizing the image data of the imaged image including the object images.

Since the object image appears as a high-intensity part in the image data of the imaged image, the image processing circuit 80d first detects the high-intensity part as a candidate of the object image. Next, the image processing circuit 80d determines whether or not the high-intensity part is the object image on the basis of the size of the detected high-intensity part. The imaged image may include images other than the object image due to sunlight through a window and light of a fluorescent lamp in the room as well as the images 340m' and 340n' corresponding to the two markers 340m and 340n as an object image. The determination processing whether or not the high-intensity part is all object image is executed for discriminating the images 340m' and 340n' as an object image from the images other than them, and accurately detecting the object image. More specifically, in the determination process, it is determined whether or not the detected high-intensity part is within the size of the preset predetermined range. Then, if the high-intensity part is within the size of the predetermined range, it is determined that the high-intensity part represents the object image. On the contrary, if the high-intensity part is not within the size of the predetermined range, it is determined that the high-intensity part represents the images other than the object image.

In addition, as to the high-intensity part which is determined to represent the object image as a result of the above-described determination processing, the image processing circuit 80d calculates the position of the high-intensity pail. More specifically, the barycenter position of the high-intensity part is calculated. Here, the coordinates of the barycenter position is called a "marker coordinate". Also, the barycenter position can be calculated with more detailed scale than the resolution of the imager 80c. Now, the resolution of the imaged image imaged by the imager 80c shall be 126×96, and the barycenter position shall be calculated with the scale of 1024×768. That is, the marker coordinate is represented by the integer from (0, 0) to (1024, 768).

Additionally, the position in the imaged image shall be represented by a coordinate system (XY coordinate system) taking the upper left of the imaged image as an origin point, the downward direction as an Y-axis positive direction, and the right direction as an X-axis positive direction.

Also, if the object image is properly detected, two high-intensity parts are determined as object images by the determination process, and therefore, two marker coordinates are calculated. The image processing circuit 80d outputs data indicative of the calculated two marker coordinates. The data of the output marker coordinates (marker coordinate data) is included in the input data by the processor 70 as described above, and transmitted to the game apparatus 12.

The game apparatus 12 (CPU 40) detects the marker coordinate data from the received input data to thereby calculate an designated position (designated coordinate) by the controller 22 on the screen of the monitor 34 and a distances from the controller 22 to each of the markers 340m and 340n on the basis of the marker coordinate data. More specifically, from the position of the mid point of the two marker coordinates, a position to which the controller 22 faces, that is, a designated position is calculated. The distance between the object images in the imaged image is changed depending on the distance between the controller 22 and each of the markers 340m and 340n, and therefore, the game apparatus 12 can grasp the distance between the controller 22 and each of the markers 340m and 340n by calculating the distance between the two marker coordinates.

Figure 8:
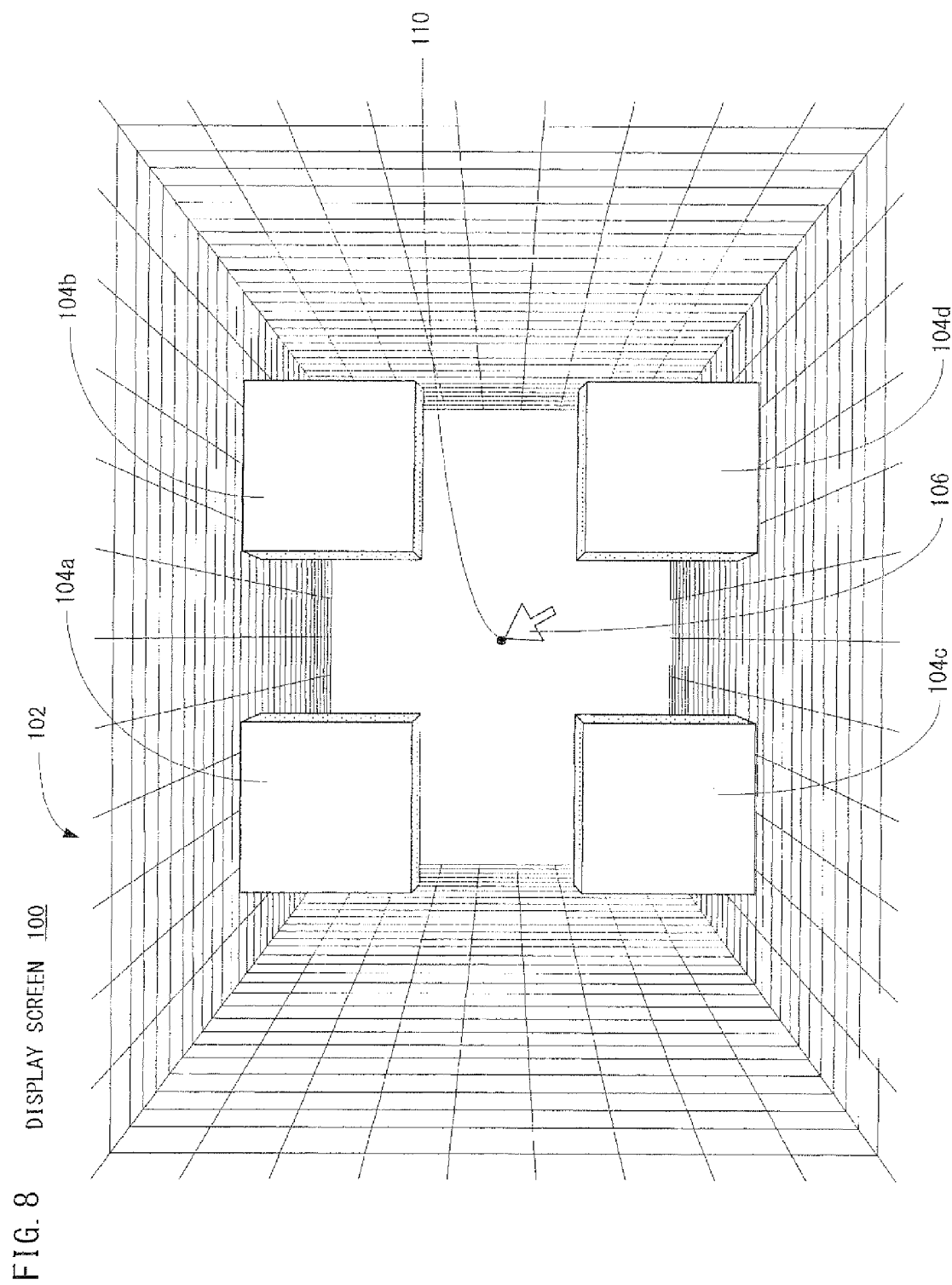
FIG. 8 is an illustrative view showing an example of a display screen to be displayed on the monitor shown in FIG. 1.

In the game system 10 with such configuration, the game apparatus 12 also functions as a three-dimensional image processing apparatus as described above, and displays a display screen 100 shown in FIG. 8 on the monitor 34 by the three-dimensional image processing in the game apparatus 12, for example.

As shown in FIG. 8, on the display screen 100, a cylindrical object 102 having a rectangular cross-section within a three-dimensional virtual space and extending in a depth direction (Z-axis direction) of the three-dimensional virtual space when seen from a viewpoint (virtual camera) is provided and displayed. In FIG. 8, in order to simplify the object 102, a matrix pattern is drawn inside the object 102. Furthermore, inside the object 102, four cubic (block-shaped) objects 104a, 104b, 104c, 104d are displayed in a matrix manner. In addition, a cursor 106 as an object of a designation image is displayed at the center of the object 102 (midpoint), and a space among the object 104a, 104b, 104c and 104d.

In addition, in FIG. 8, a vanishing point 110 is displayed at the position designated by the cursor 106. It should be noted that the vanishing point 110 is never displayed on the actual display screen 100. Here, the vanishing point 110 is a point existing at infinity when seen from a virtual camera on the straight line passing through a gazing point from the viewpoint (virtual camera) (see FIG. 9). For example, a rail runs straight, and a train moving on the rail becomes smaller toward a distant place, and converges at the vanishing point before long. With respect to some games, for example, a bullet fired by a player object and a missile launched by a combat plane also converge at the vanishing point.

In addition, in this embodiment, a position within the three-dimensional space corresponding to a designation position with the cursor 106 is set to a gazing point of the virtual camera (viewpoint). Accordingly, on the display screen 100, the gazing point is overlapped with the vanishing point 110. It should be noted that this gazing point is also never displayed on the actual display screen 100.

On such a display screen 100 (three-dimensional virtual space), the player can move the cursor 106 by operating the controller 22. In this embodiment, assuming that the cursor 106 is a two-dimensional object, and arranged (displayed) on a projection plane. In this embodiment, the projection plane is set to a near clipping plane described later.

Here, an object like the cursor 106 moving and so forth, according to an operation by the player or the user may be arranged within the three-dimensional virtual space as a three-dimensional object. In such a case, a partial range of the three-dimensional virtual space including the three-dimensional object moving and so forth, according to an operation by the player or the user is projected onto the projection plane. Accordingly, the three-dimensional object which is subjected to the projection transformation is displayed on the projection plane. For example, in the virtual game, a three-dimensional object (player object), such as a person, a car, a combat plane, etc. is arranged within the three-dimensional virtual space, and are controlled in movement, etc. on according to an operation by the player.

Also, in a case that the cursor 106 is arranged within the three-dimensional virtual space as a three-dimensional object, transforming the amount of movement of the cursor on the projection plane of the imaged image into the amount of movement from the gazing point on the gazing point plane (S21) as described later consequently means that the position of the cursor 106 within the three-dimensional virtual space is transformed into the position on the gazing point plane.

In a case that the display screen 100 shown in FIG. 8 is displayed, the objects 102, 104a-104d are first arranged (performs modeling) within the three-dimensional virtual space. Next, which range is to be clipped in the three-dimensional virtual space is decided. When the range to be clipped is decided, a position of the gazing point is decided on the basis of it. That is, a position coordinate (ax, ay, az) of the gazing point is decided. Here, as shown in FIG. 9-FIG. 11, the camera coordinate system is a coordinate system when a horizontal (lateral) direction of the three-dimensional virtual space is an X-axis direction, a vertical (longitudinal) direction thereof is a Y-axis direction, and a depth direction thereof is a Z-axis direction. Furthermore, in a case that a direction in which the near clipping plane and the far clipping plane are seen from the virtual camera is a front direction, the left direction is a plus direction of the X axis, the upper direction is a plus direction of the Y axis, and the front direction is a plus direction of the Z axis. Noted that in the camera coordinate system, the origin (0, 0, 0) is the position of the virtual camera (viewpoint).

Next, an orientation of the viewpoint (virtual camera) in the three-dimensional virtual space is set, and the distance d between the gazing point and the virtual camera is set. Here, the orientation of the virtual camera is set to three vectors of a front direction (Zx, Zy, Zz), an upward direction (Yx, Yy, Yz) and a left direction (Xx, Xy, Xz), and each vector has a unit vector of size "1".

Moreover, a distance n from the virtual camera to the near clipping plane, and a distance f from the virtual camera to the far clipping plane are decided. Here, these distance n and distance f are decided depending on which range of the three-dimensional virtual space is to be clipped. In addition, a size (the lateral length wx and the longitudinal length wy) of the near clipping plane is set. Here, the size of the near clipping plane is decided by the size of an object to be displayed, that is, the screen (monitor 34).

Thus, as shown in FIG. 9, in a case that the three-dimensional virtual space is viewed from the virtual camera, when the near clipping plane and the far clipping plane are decided as described above, a pyramidal cone (quadrangular pyramid) 200 is defined. As to the cone 200, the quadrangular pyramid frustum part sandwiched between the near clipping plane and the far clipping plane is a view volume.

Additionally, FIG. 9 is a perspective view of the cone 200 as seen from the rear obliquely upward of the virtual camera.

Here, in this embodiment, in order to discriminate the entire quadrangular pyramid taking the position of the virtual camera as a vertex and the far clipping plane as a bottom surface from the quadrangular pyramid frustum taking the near clipping plane as a top surface and the far clipping plane as a bottom surface, this quadrangular pyramid is called a "cone", but this "cone" may be called a "viewing frustum" and a "view volume".

As shown in FIG. 9, the gazing point plane is provided between the near clipping plane and the far clipping plane. Specifically, the gazing point plane means a plane being in parallel with the near clipping plane and the far clipping plane, and a plane to which the gazing point of the virtual camera is set (included). In this embodiment, out of the six faces of each of the objects 104a-104d displayed on the display screen 100 as shown in FIG. 8 (the same is true for FIG. 12 and FIG. 13), each object 104a-104d is arranged in the three-dimensional virtual space such that the face turned to this side (viewpoint side) is in the same plane with the gazing point plane.

When the player or the user moves the cursor 106 on the display screen 100 shown in FIG. 8 by means of the controller 22, the gazing point is moved according thereto. In the general three-dimensional image processing, when the gazing point is moved, the virtual camera is also moved according thereto, and thus the cone 200 is also translated (moved in parallel) according to the movement. Therefore, the display screen 100 is scrolled. Accordingly, in a case that an attack is made by firing a bullet at an enemy object existing in a distant place, even if the player object is moved to align with the front of the enemy object, the bullet object fired by the player object converges into the vanishing point 110. That is, in a case that the player object does not exist at the center of the screen, the bullet object fired by the player object flies to an oblique direction. Therefore, the player has to fire a bullet while predicting this fact, or has to fire a bullet on trial and then fire a bullet at the enemy object. However, such prediction is difficult, and firing on trial needs wasteful attacking operations.

Thereupon, in this embodiment, even if the gazing point is moved, the gazing point and the vanishing point are overlapped with each other on the display screen by deforming the view volume such that the gazing point plane is not moved, that is, the gazing point plane is maintained at an original position. Thus, the full-front in the three-dimensional virtual space is coincident with the full-front on the two-dimensional display screen (projection plane). Consequently, it is possible to easily recognize (grasp) the three-dimensional virtual space.

The view volume deformation processing is explained in detail by utilizing FIG. 10 and FIG. 11. Here, FIG. 10(A) is a perspective view of the cone 200 as seen from the rear obliquely upward of the virtual camera, and FIG. 10(B) is a top view of the cone 200 as seen from a vertically upwards (directly above), FIG. 11(A) is a side view of the cone 200 as seen from the right side surface, and FIG. 11(B) is a rear end view of the cone 200 as seen from the rear of the virtual camera. Furthermore, in FIG. 11 and FIG. 12, the cone 200 represented by a heavy black line is a reference (original) cone (referred to as "200a", for the sake of convenience of description), the cone 200 represented by an outline heavy line is a cone (referred to as "200b", for the sake of convenience of description) obtained by translating the cone 200a as a reference according to the movement of the gazing point, and the cone 200 represented by a shaded heavy line is a cone (referred to as "200c", for the sake of convenience of description) obtained by deforming the translated cone 200b (view volume).

As described above, when the cursor 106 is moved, an amount of movement of the cursor 106 (cursor movement amount) on the display screen 100, that is, on the projection plane is calculated. In this embodiment, the amount of movement of the cursor is calculated for each X-axis direction and Y-axis direction, and is represented by a distance from a reference position on the projection plane (display screen 100). The reference position in this embodiment is the center point of the projection plane.

The amount of movement of the cursor on the display screen 100 is transformed into an amount of movement within the three-dimensional space, and a position (designation position) designated by the moved cursor 106 is set as a new gazing point. The position of the virtual camera (camera coordinate) is set in accordance with the new gazing point. That is, the virtual camera is translated according to the movement of the cursor 106.

As best understood from FIG. 10(B) and FIG. 11(A), in accordance with the movement of the cursor 106, the cone 200a as a reference is translated to a position represented by the cone 200b. It should be noted that the amount of movement in the X-axis direction (horizontal direction) in the three-dimensional virtual space is shown in FIG. 10(B) and the amount of movement in the Y-axis direction (vertical direction) in the three-dimensional virtual space is shown in FIG. 11(A).

For example, the designated position of the cursor 106 on the projection plane, that is, a two-dimensional vector (sx, sy) indicating an amount of movement of the cursor is detected, taking the center point of the projection plane (display screen 100) in the local coordinate as an origin (0, 0). Here, in the local coordinate system, the horizontal direction is an X-axis direction, and the vertical direction is a Y-axis direction. Furthermore, the left direction is a plus direction of the X-axis, and the upwards direction is a plus direction of the Y-axis. Furthermore, in this embodiment, although the notation of "amount of movement of the cursor" is used, this means a displace amount (displacement) from the origin (0, 0), and this does not always presuppose that the cursor 106 is moved. That is, if the cursor 106 is moved from the origin (0, 0) and then remains to be the position after the movement as well, the amount of movement of the cursor is detected. If the amount of movement of the cursor is 0 here, since the gazing point is not changed, a projection transformation is directly performed to display the display screen 100 shown in FIG. 8 on the monitor 34. On the other hand, if the amount of movement of the cursor is not 0, the amount of movement of the cursor is transformed into the amount of movement when the center point of the gazing point plane in the local coordinate of the three-dimensional virtual space is taken as an origin point (0, 0, 0). Three-dimensional vectors (vx, vy, vz) indicating the transformed amount of movement are calculated according to Equation 1 by utilizing the three vectors indicating the orientations of the virtual camera.

$$vx = sx \times Xx + sy \times Yx$$

$$vy = sx \times Xy + sy \times Yy$$

$$vz = sx \times Xz + sy \times Yz \qquad \text{[Equation 1]}$$

Furthermore, a new gazing point (bx, by, bz) aligned with the position of the cursor 106 is calculated according to Equation 2. That is, the new gazing point (bx, by, bz) is evaluated by translating an original gazing point (ax, ay, az) to the designation position by the cursor 106 after the movement.

$$bx = ax + vx$$

$$by = ay + vy$$

$$bz = az + vz \qquad \text{[Equation 2]}$$

In addition, a camera coordinate (cx, cy, cz) aligned with the new gazing point (bx, by, bz) is calculated according to Equation 3.

$$cx = bx - d \times Zx$$

$$cy = by - d \times Zy$$

$$cz = bz - d \times Zz \qquad \text{[Equation 3]}$$

In this embodiment, the camera coordinate can be calculated from the gazing point, the orientation of the virtual camera, and the distance between the gazing point and the virtual camera, and therefore, the calculating processing according to the Equation 3 is accomplished only once. However, in a case that the camera coordinate (cx, cy, cz) is previously calculated, translating the camera coordinate (cx, cy, cz) previously (just before) calculated is also possible similar to the gazing point. More specifically, according to Equation 4, a camera coordinate after the translation is calculated. In such a case, the calculating processing of calculating the camera coordinate in advance and of translating the camera coordinate calculated just before is executed.

$$cx = cx + vx$$

$$cy = cy + vy$$

$$cz = cz + vz \qquad \text{[Equation 4]}$$

When the gazing point and the camera coordinate are thus moved, the original cone 200a is translated like the cone 200b represented by the outline heavy line in FIG. 10 and FIG. 11. This is merely a scrolling, and therefore, the range of the cone 200 (view volume) is set such that the movement of the original gazing point (ax, ay, az) is canceled out to make the original gazing point (ax, ay, az) remain at the center of the display screen 100. That is, the cone 200b (view volume) is deformed such that the gazing point plane is not moved from the original position represented by the original cone 200a. More specifically, after the amount of movement on the gazing point plane (movement amount of the cursor) is transformed into an amount of movement on the near clipping plane, the positions of the right and left ends and the upper and the lower ends of the near clipping plane are set to suite the size of the near clipping plane. This is set according to Equation 5. Here, the position of the left end of the near clipping plane (screen) is x1, the position of the right end of the screen is x2, the position of the upper end of the screen is y1, and the position of the lower end of the screen is y2.

$$x1 = -sx \times (n \div d) + (wx \div 2)$$

$$x2 = -sx \times (n \div d) - (wx \div 2)$$

$$y1 = -sy \times (n \div d) + (wy \div 2)$$

$$y2 = -sy \times (n \div d) - (wy \div 2) \quad \text{[Equation 5]}$$

It should be noted that by multiplying the ratio of the distance d from the virtual camera to the gazing point plane and the distance n from the virtual camera to the near clipping plane, the amount of movement on the gazing point plane is transformed into the amount of movement on the near clipping plane. Furthermore, since the amount of movement of the cursor (sx, sy) from the center point on the projection plane (near clipping plane) is used, the lateral length wx and the longitudinal length wy are halved and then added or subtracted.

The view volume, that is, the cone 200 is thus deformed. As described above, the deformed cone 200c is represented by the shaded heavy line in FIG. 10 and FIG. 11. As understood from FIG. 10 and FIG. 11, the gazing point plane in the original cone 200a and the gazing point plane in the deformed cone 200c are overlapped with each other. That is, the cone 200 (view volume) is deformed so as not to move the gazing point plane.

When the cone 200 (view volume) is deformed, a camera matrix is generated on the basis of the camera coordinate (cx, cy, cz), the gazing point (bx, by, bz) and information {n, f, x1, x2, y1, y2} on the cone 200 (view volume). Here, the camera matrix is composed of 3×4 view matrix for transforming the three-dimensional virtual space into the direction seen from the virtual camera, and a 4×4 projection matrix for projecting on the two-dimensional screen (projection plane). More specifically, Equation 6 shows the view matrix, and Equation 7 shows the projection matrix.

$$\begin{bmatrix} -Xx & -Xy & -Xz & cx \times Xx + cy \times Xy + cz \times Xz \\ Yx & Yy & Yz & -cx \times Yx - cy \times Yy - cz \times Yz \\ -Zx & -Zy & -Zz & cx \times Zx + cy \times Zy + cz \times Zz \end{bmatrix} \quad \text{[Equation 6]}$$

-continued $$\begin{bmatrix} \frac{2 \times n}{x2 - x1} & 0 & \frac{x2 + x1}{x2 - x1} & 0 \\ 0 & \frac{2 \times n}{y1 - y2} & \frac{y1 + y2}{y1 - y2} & 0 \\ 0 & 0 & \frac{-(f+n)}{f-n} & \frac{-2 \times f \times n}{f-n} \\ 0 & 0 & -1 & 0 \end{bmatrix} \quad \text{[Equation 7]}$$

The display screen 100 in which the projection transformation (perspective transformation) is made according to the camera matrix, that is, the three-dimensional image is rendered on the projection plane and the position of the cursor 106 (gazing point) is moved is displayed on the monitor 34. As a result, the display screen 100 is displayed such that even if the position of the cursor 106 (gazing point) is moved, the gazing point and the vanishing point 110 are overlapped with each other on the display screen 100 (projection plane).

Figure 12:
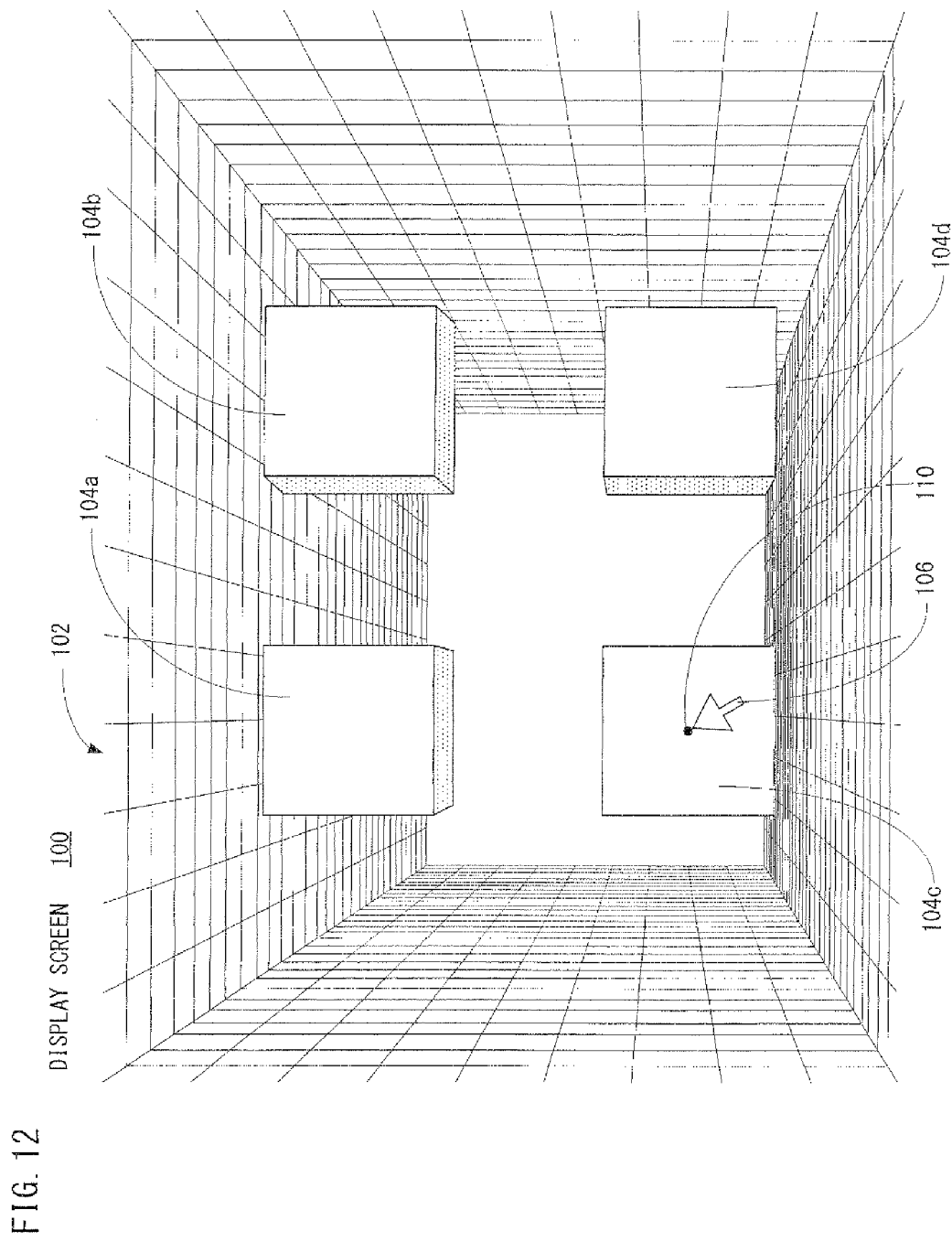
FIG. 12 is an illustrative view showing another example of a display screen to be displayed on the monitor shown in FIG. 1.

Accordingly, as shown in FIG. 12 and FIG. 3, in a case that the cursor 106 is moved, the position (designation position) designated by the cursor 106 becomes the front of the three-dimensional virtual space and the two-dimensional display screen 100. In FIG. 12, the center of the object 104c at the lower left is designated with the cursor 106, and the gazing point and the vanishing point 110 are overlapped with the designation position on the display screen 100. Similarly, in FIG. 13, the space between the object 104b at the upper right and the object 104d at the lower right is designated with the cursor 106, and the gazing point and the vanishing point 110 are overlapped with the designation position on the display screen 100.

Figure 13:
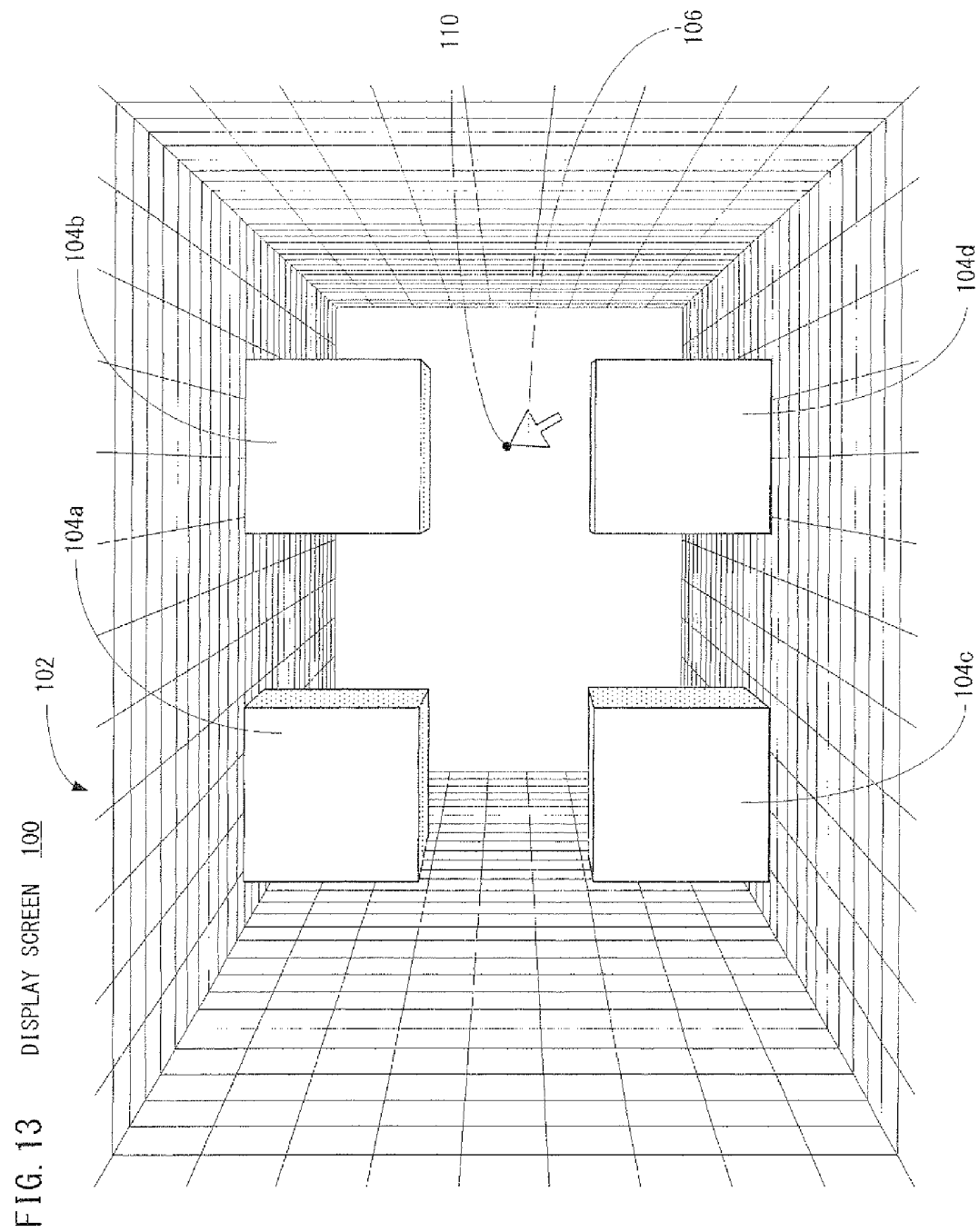
FIG. 13 is an illustrative view showing a further example of a display screen to be displayed on the monitor shown in FIG. 1.

As understood from FIG. 8, FIG. 12 and FIG. 13, even if the cursor 106 (gazing point) is moved, the gazing point plane is not moved. That is, the original gazing point is not moved from the center of the display screen 100 (projection plane).

Figure 14:
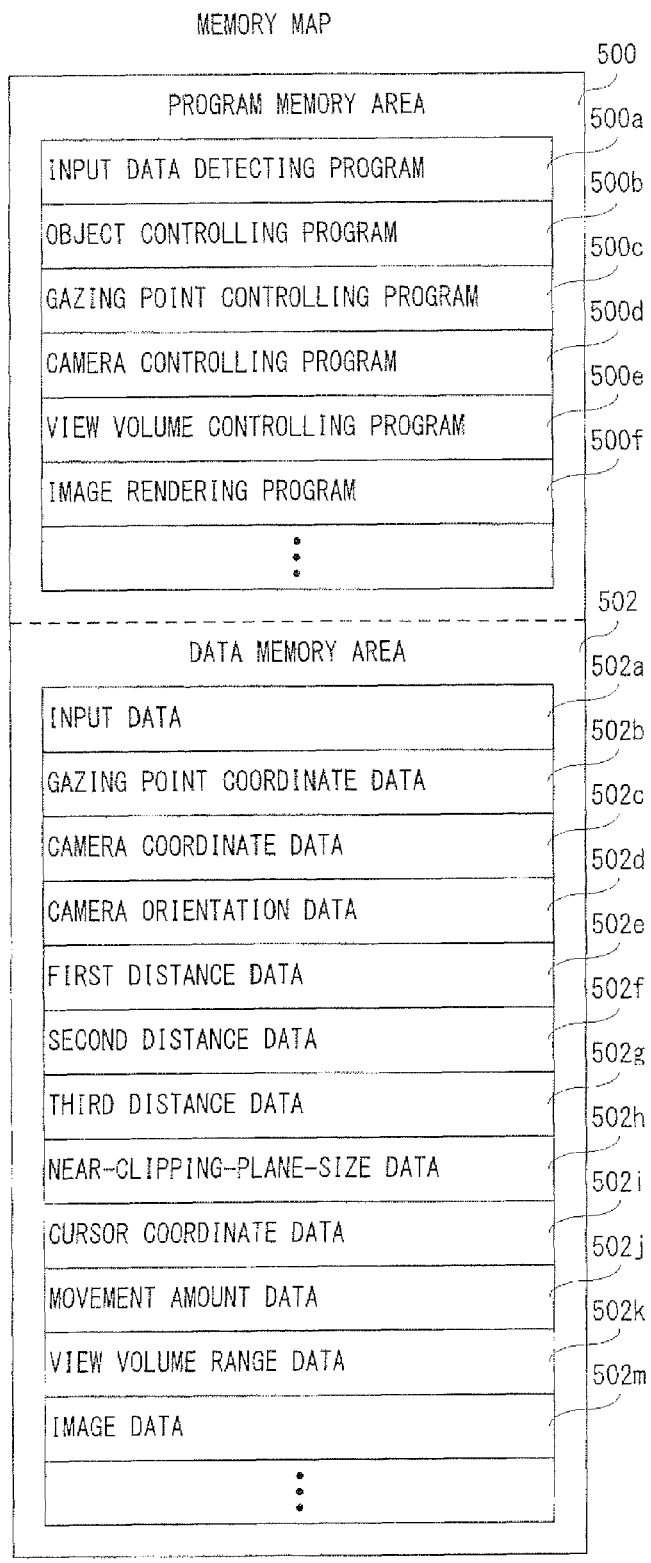
FIG. 14 is an illustrative view showing a memory map of a main memory shown in FIG. 2.

FIG. 14 shows a memory map of a main memory (42e or 46) shown in FIG. 2. As shown in FIG. 14, the main memory 42e, 46 includes a program memory area 500 and a data memory area 502. The program memory area 500 stores a three-dimensional image processing program, and the three-dimensional image processing program is composed of an input data detecting program 500a, an object controlling program 500b, a gazing point controlling program 500c, a camera controlling program 500d, a view volume controlling program 500e, an image rendering program 500f, etc.

The input data detecting program 500a is a program for detecting input data from the controller 22, and storing (temporarily storing) the detected input data in the data memory area 502. The object controlling program 500b is a program for controlling a movement, etc. of the object (106) by the input data detected according to the input data detecting program 500a.

The gazing point controlling program 500c is a program for setting a position of the gazing point of the virtual camera, specifically, automatically setting the gazing point to the pre-set reference position, setting (moving) the gazing point according to an instruction by the player or the user. In this embodiment, the cursor 106 is moved according to an operation input (input data) from the controller 22 by the player or the user, and the gazing point is moved according thereto. It should be noted that when the display screen 100 is first displayed, the gazing point is set to a position overlapped with the center of the screen (reference position).

The camera controlling program 500d is a program for setting a position of the virtual camera (camera coordinate)

and an orientation of the virtual camera. In this embodiment, when the display screen 100 is first displayed, the gazing point of the virtual camera, the orientation of the virtual camera and the distance between the virtual camera and the gazing point are set to clip a part of the range intended by a manufacturer, etc in the three-dimensional virtual space. However, when the gazing point is changed according to the movement of the cursor 106, the position and orientation of the virtual camera are changed according to the change of the gazing point.

The view volume controlling program 500c is a programs for setting a range of the cone 200 (view volume). In this embodiment, when the gazing point is changed, the range of the cone 200 (view volume) is set (changed) according to the change of the gazing point. The image rendering program 500f is a program for generating a camera matrix from the information on the position, the gazing point and the view volume (cone 200) of the virtual camera, and rendering a three-dimensional image according to the camera matrix.

Although illustration is omitted, the three-dimensional image processing program includes a program for generating objects within the three-dimensional virtual space and a program for pasting a texture, and so on.

The data memory area 502 stores input data 502a, gazing point coordinate data 502b, camera coordinate data 502c, camera orientation data 502d, first distance data 502e second distance data 502f, third distance data 502g, near-clipping-plane-size data 502h, cursor coordinate data 502i, movement amount data 502j, view volume range data 502k, image data 502m, etc.

The input data 502a is data detected according to the input data detecting program 500a as described above, and is input (transmitted) from the controller 22. The input data 502a is deleted from the data memory area 502 when it is used for the cursor 106 movement processing, for example. The gazing point coordinate data 502b is data on the position coordinate of the gazing point in the three-dimensional virtual space. The camera coordinate data 502c is data on the position (camera coordinate) of the virtual camera in the three-dimensional virtual space. The camera orientation data 502d is data on the orientation (front face direction, upwards direction, left direction) of the virtual camera in the three-dimensional virtual space.

The first distance data 502e is data on the distance d between the gazing point and the virtual camera. The second distance data 502f is data on the distance n front the virtual camera to the near clipping plane. The third distance data 502g is data on the distance f from the virtual camera to the far clipping plane. The near-clipping-plane-size data 502h is data on the lateral length wx and longitudinal the length wf of the near clipping plane.

The cursor coordinate data 502i is data on the position coordinate of the cursor 106 on the two-dimensional projection plane (display screen 100). The movement amount data 502j is data obtained by transforming the distance (amount of movement of the cursor) from the center of the two-dimensional projection plane to the designation position of the cursor 106 into the distance (amount of movement) from the center of the gazing point plane in the three-dimensional virtual space.

The view volume range data 502k is data for setting a range of the view volume (cone 200), and specifically coordinate data relative to the position x1 of the left end of the near clipping plane (screen), the position x2 at the right end of the screen, the position y1 at the upper end of the screen, and the position y2 at the lower end of the screen. The image data 502m is data, such as polygon data, texture data, etc. for producing an object, etc. in the three-dimensional virtual space.

Although illustration is omitted, in the data memory area 502, another data for executing the three-dimensional image processing program is stored, and a counter (timer) and a flag are provided.

Figure 15:
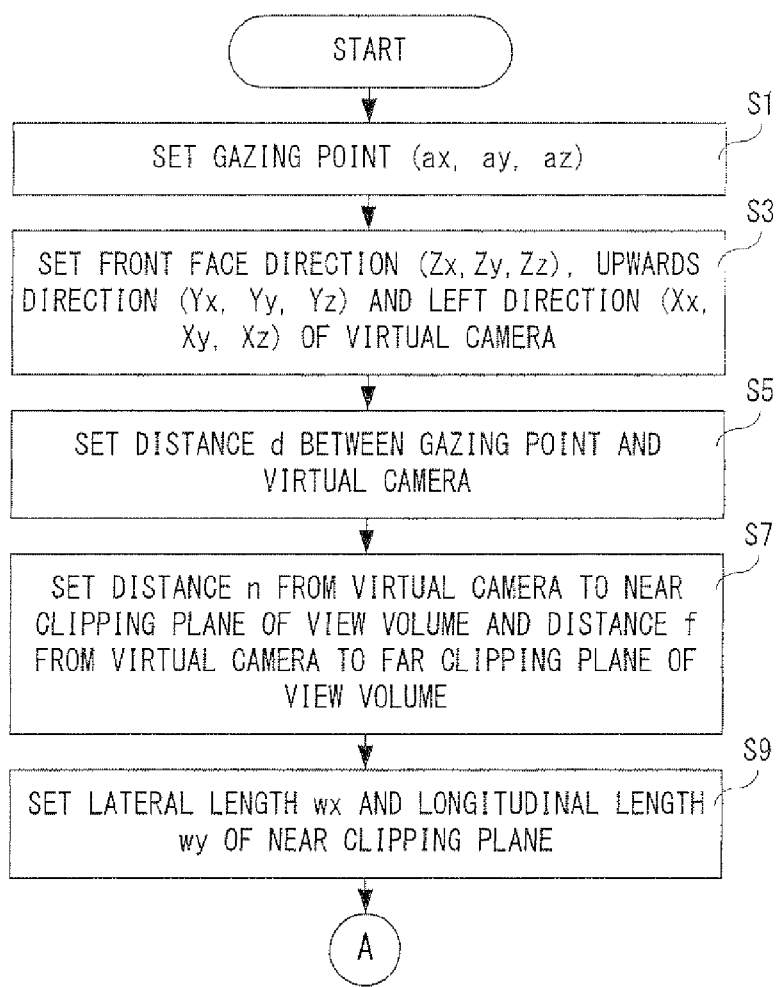
FIG. 15 is a flowchart showing a part of the three-dimensional image processing of the CPU shown in FIG. 2.
Figure 16:
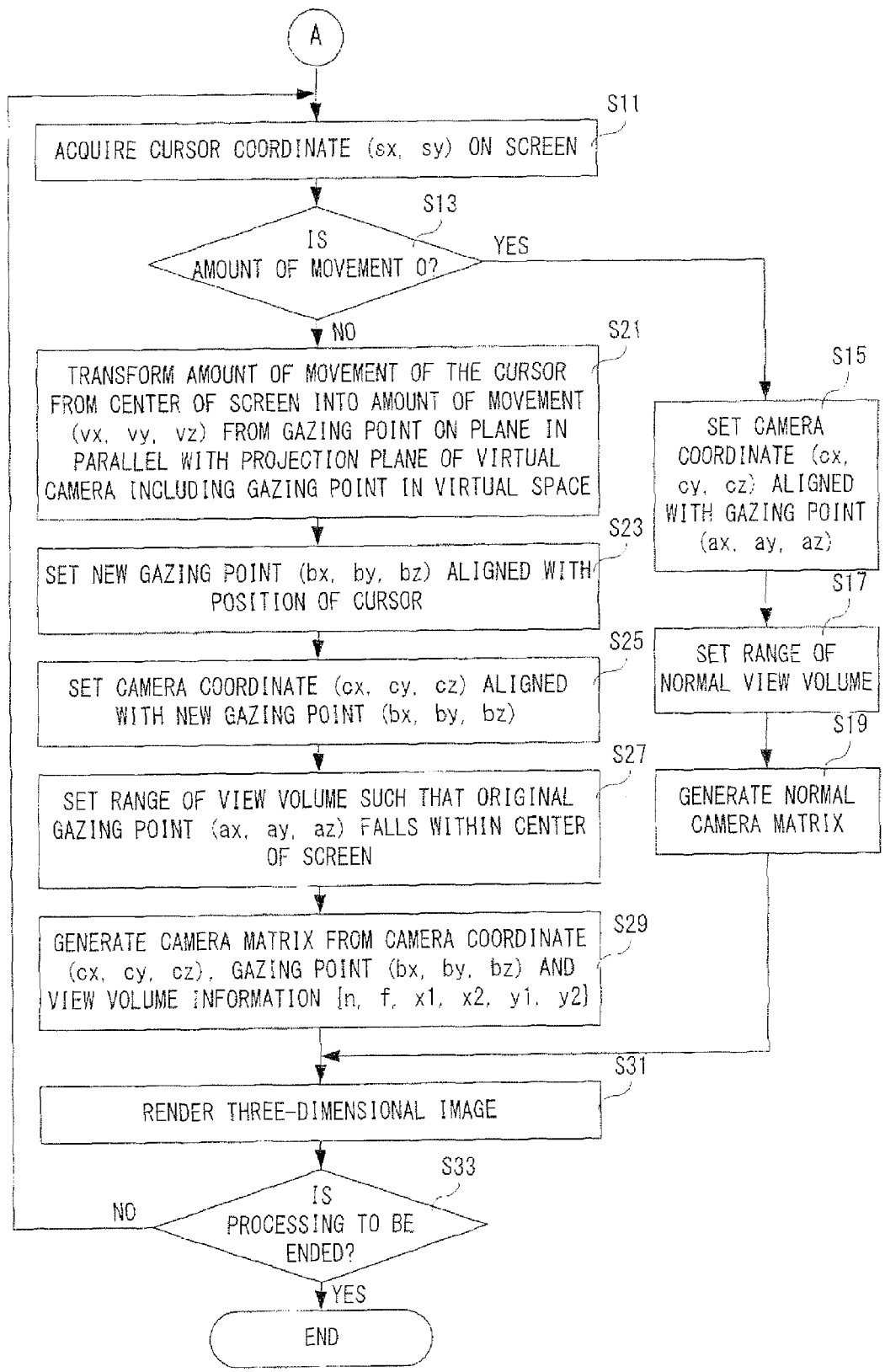
FIG. 16 is a flowchart showing another part of the three-dimensional image processing by the CPU shown in FIG. 2, and being sequel to FIG. 15.

More specifically, the CPU 40 shown in FIG. 2 executes three-dimensional image processing according to the flowchart shown in FIG. 15 and FIG. 16. Although illustration and detailed explanation are omitted, according to another processing, the CPU 40 executes input data detecting processing and object moving processing, and moves the cursor 106 on the projection plane according to the input data from the controller 22.

As shown in FIG. 15, when starting the three-dimensional image processing, the CPU 40 sets a gazing point (ax, ay, az) in a step S1. That is, a position coordinate (gazing point coordinate) of the gazing point in the three-dimensional virtual space is set, and the gazing point data 502b corresponding to the set gazing point coordinate is stored in the data memory area 502.

In a next step S3, the front face direction (Zx, Zy, Zz), the upwards direction (Yx, Yy, Yz) and the left direction (Xx, Xy, Xz) of the virtual camera are set. That is, an orientation of the virtual camera is set, and the camera orientation data 502d corresponding to the set orientation is stored in the data memory area 502. It should be noted that the size of the vector representing each direction is "1".

Succeedingly, in a step S5, a distance d between the gazing point and the virtual camera is set. That is, a distance d between the gazing point and the virtual camera is decided, and the first distance data 502e corresponding to the decided distance d is stored in the data memory area 502. In a step S7, a distance n from the virtual camera to the near clipping plane of the view volume and a distance f from the virtual camera to the far clipping plane of the view volume are set. That is, the distance n and the distance f are decided, and the second distance data 502f corresponding to the distance n is stored in the data memory area 502, and the third distance data 502g corresponding to the distance f is stored in the data memory area 502.

In a succeeding step S9, a lateral length wx and a longitudinal length wy of the near clipping plane are set. That is, the lateral length wx and the longitudinal length wy are decided, and the near-clipping-plane-size data 502h corresponding to the decided lateral length wx and the longitudinal length wy are stored in the data memory area 502.

As shown in FIG. 16, in a next step S11, a cursor coordinate (sx, sy) on the screen is acquired. That is, a display position of the cursor 106 on the display screen 100 (projection plane) is detected. Then, the cursor coordinate data 502i corresponding to the detected display position of the cursor 106 is stored in the data memory area 502.

In a next step S13, it is determined whether or not an amount of movement of the cursor is 0. That is, it is determined whether or not the cursor coordinate (sx, sy) is (0, 0). If "YES" in the step S13, that is, if the cursor coordinate (sx, sy) is (0, 0), it is determined that the amount of movement of the cursor is 0, and then, a camera coordinate (cx, cy, cz) aligned with the gazing point (ax, ay, az) is set in a step S15. Here, the CPU 40 calculates the camera coordinate (cx, cy, cz) according to Equation 8, and stores the camera coordinate data 502c corresponding to the calculated camera coordinate in the data memory area 502. Here, the Equation 8 is an equation obtained by substituting the coordinate of the gazing point (ax, ay, az) into the Equation 3.

$$cx = ax - d \times Zx$$

$$cy = ay - d \times Zy$$

$$cz = az - d \times Zz \quad \text{[Equation 8]}$$

In a succeeding step S17, a range of the normal view volume is set. Here, the CPU 40 calculates the range of the view volume, that is, the position x1 at the left end of the screen, the position x2 at the right end of the screen, the position y1 at the upper end of the screen, and the position y2 at the lower end of the screen according to Equation 9, and stores the view volume range data 502k corresponding to the calculated range of the view volume in the data memory area 502. Here, the Equation 9 is an equation obtained by taking sx=sy=0 in the Equation 5.

$$x1 = wx \div 2$$

$$x2 = -wx \div 2$$

$$y1 = wy \div 2$$

$$y2 = -wy \div 2 \quad \text{[Equation 9]}$$

Then, in a step S19, a normal camera matrix is generated, and the process proceeds to a step S31. Here, in the step S19, the camera matrix shown in the Equation 6 and the Equation 7 is calculated from the gazing point (ax, ay, az), the camera coordinate (cx, cy, cz) calculated in the step S15, and the view volume information {n, f, x1, x2, y1, y2} including the range of the view volume calculated in the step S17.

Furthermore, if "NO" in the step S13, that is, if the cursor coordinate (sx, sy) is not (0, 0), it is determined that the amount of movement of the cursor is not 0, and then, in a step S21, the amount of movement of the cursor from the center of the screen is transformed into an amount of movement (vx, vy, vz) from the gazing point on the plane in parallel with the camera projection plane including the gazing point of the virtual space. More specifically, the CPU 40 calculates the amount of movement of the cursor (distance for each X-axis direction and Y-axis direction) from the center of the display screen 100 (projection plane) to the position of the cursor 106 (cursor position), and transforms the calculated amount of movement into the an amount of movement of the cursor on the gazing point plane in the three-dimensional virtual space according to the Equation 1. The data on the transformed amount of movement (movement amount data) 502j is stored in the data memory area 502.

In a next step S23, a new gazing point (bx, by, bz) aligned with the cursor position is set. That is, the CPU 40 transforms the position (designation position) designated with the cursor 106 on the display screen 100 (projection plane) into the position on the gazing point plane in the three-dimensional virtual space according to the Equation 2, decides the transformed designation position as a new position coordinate of the gazing point, and stores the gazing point coordinate data 502b corresponding to the decided position coordinate in the data memory area 502. That is, the gazing point coordinate data 502b is updated.

Succeedingly, in a step S25, a camera coordinate (cx, cy, cz) aligned with the new gazing point (bx, by, bz) is set. That is, the CPU 40 translates the position coordinate (camera coordinate) of the virtual camera according to the Equation 3 similar to the gazing point translated according to the position of the cursor 106, and stores the camera coordinate data 502c corresponding to the translated camera coordinate in the data memory area 502.

Next, in a step S27, the range of the view volume is set so as to make the original gazing point (ax, ay, az) fall within the center of the screen. Specifically, the CPU 40 calculates an amount of movement of each side of the near clipping plane so as to cancel out the movement amount of the cursor 106 (original gazing point) on the display screen 100 according to the Equation 5. That is, the CPU 40 calculates a range (x1, x2, y1, y2) of the view volume, and stores the view volume range data 502k corresponding to the calculated range of the view volume in the data memory area 502. Accordingly, the view volume (cone 200) is deformed so as not to move the gazing point plane.

In a succeeding step S29, a camera matrix shown in the Equation 6 and the Equation 7 is generated from the camera coordinate (cx, cy, cz), the gazing point (bx, by, bz), and the view volume information {n, f, x1, x2, y1, y2}. When the camera matrix is generated in the step S19 or the step S29, three-dimensional rendering is made in the step S31. That is, the three-dimensional image is rendered on the projection plane according to the camera matrix to thereby display the display screen 100 on the monitor 34.

Then, in a step S33, it is determined whether or not the three-dimensional image processing is to be ended. That is, it is determined whether or not an instruction of ending the three-dimensional image processing is input according to the designation by the player or the user. If "NO" in the step S33, that is, if the three-dimensional image processing is not to be ended, the process returns to the step S11 as it is. On the other hand, if "YES" in the step S33, that is, if the three-dimensional image processing is to be ended, the processing is directly ended.

According to this embodiment, when the gazing point is moved according to the movement of an object like a cursor, since the view volume is deformed so as not to move the gazing point plane, the gazing point and the vanishing point are overlapped with each other on the projection plane (display screen). Thus, since the full-front in the three-dimensional virtual space is coincident with the full-front on the two-dimensional display screen, it is easily recognize (grasp) the three-dimensional virtual space.

Additionally, in this embodiment, the gazing point is moved according to the movement of an object like a cursor, but the gazing point may be directly moved.

Furthermore, in this embodiment, an object like a cursor is moved, but if a game is played by means of the game apparatus, a player object may be displayed in place of the cursor.

Additionally, in this embodiment, an explanation is only made on a game apparatus separately provided with the game machine and the monitor, but other game apparatuses, such as a computer having a game function, a hand-held game apparatus which are integrally provided with a monitor (including a cellular phone having a game function) and an arcade game may be used.

Although example embodiments of the present invention have been described and illustrated in detail, it is clearly understood that the same is by way of illustration and example only and is not to be taken by way of limitation, the spirit and scope of the present invention being limited only by the terms of the appended claims.

What is claimed is:

1. A non-transitory storage medium storing a three-dimensional image processing program to be executed by a computer of a three-dimensional image processing apparatus to output an image obtained by imaging a three-dimensional virtual space with a virtual camera on a display,
 said three-dimensional image processing program causes the computer of said three-dimensional image processing apparatus to provide functionality comprising:
  an operation input detection for detecting an operation input from an input device;
  an object movement for moving an object within said three-dimensional virtual space or on said image on the basis of the operation input detected by said operation input detection;
  a parameter setting for setting a gazing point and a position coordinate of said virtual camera on the basis of a position of said object within said three-dimensional virtual space or on said mage; and
  a view volume deformation for deforming a view volume of said virtual camera so as not to move a plane including the gazing point of said virtual camera and being in parallel with a projection plane of said image in a case that said object is moved by said object movement.

2. A non-transitory storage medium storing a three-dimensional image processing program to be executed by a computer of a three-dimensional image processing apparatus to output an image obtained by imaging a three-dimensional virtual space with a virtual camera on a display,
 said three-dimensional image processing program causes the computer of said three-dimensional image processing apparatus to provide functionality comprising:
  an operation input detection for detecting an operation input from an input device;
  an object movement for moving an object within said three-dimensional virtual space or on said image on the basis of the operation input detected by said operation input detection;
  a displacement amount detection for detecting an amount of displacement of the object with respect to a reference point set within said three-dimensional virtual space or on said image; and
  a parameter setting for setting, in a case that the amount of displacement detected by said displacement amount detection is not 0, a parameter of said virtual camera such that said amount of displacement is canceled out, and the position of said object and a vanishing point in said three-dimensional virtual space are overlapped with each other, on the projection plane of said image.

3. A non-transitory storage medium storing a three-dimensional image processing program according to claim 2, wherein
 the parameter set by said parameter setting includes a position coordinate, a gazing point and a view volume of said virtual camera.

4. A non-transitory storage medium storing a three-dimensional image processing program according to claim 1, wherein
 said object is a two-dimensional object rendered on the projection plane of said image.

5. A non-transitory storage medium storing a three-dimensional image processing program according to claim 1, wherein
 said object is a three-dimensional object within said three-dimensional virtual space, and a part of range of the three-dimensional virtual space including said three-dimensional object is projected onto the projection plane of said image obtained by imaging with said virtual camera.

6. A non-transitory storage medium storing a three-dimensional image processing program according to claim 5, wherein
 said three-dimensional image processing program causes said computer to provide functionality comprising a position transformation for transforming the position of said object within said three-dimensional virtual space into a position on a plane in parallel with the projection plane of said image in said three-dimensional virtual space, and
 said parameter setting sets the gazing point and the position coordinate of said virtual camera on the basis of the position transformed by said position transformation.

7. A non-transitory storage medium storing a three-dimensional image processing program according to claim 2, wherein
 said object is a three-dimensional object within said three-dimensional virtual space, and is projected onto the projection plane of said image obtained by imaging a part of the range of said three-dimensional virtual space including said three-dimensional object with said virtual camera.

8. A non-transitory storage medium storing a three-dimensional image processing program according to claim 7, wherein
 said three-dimensional image processing program causes said computer to provide further functionality comprising a displacement amount transformation for transforming the amount of displacement of the object with respect to the reference point set within said three-dimensional virtual space which is detected by said displacement amount detection into an amount of displacement on a plane in parallel with the projection plane of said image in said three-dimensional virtual space, and
 said parameter setting sets, in a case that the amount of displacement transformed by said displacement amount transformation is not 0, the parameter of said virtual camera so as to cancel out said amount of displacement.

9. A non-transitory storage medium storing a three-dimensional image processing program according to claim 1, wherein
 said parameter setting sets the position coordinate of said virtual camera on the basis of a gazing point and an orientation of said virtual camera, and a distance between the gazing point and said virtual camera.

10. A non-transitory storage medium storing a three-dimensional image processing program according to claim 1, wherein
 said parameter setting sets the position coordinate of said virtual camera by translating a preceding position coordinate of said virtual camera in accordance with the movement of the gazing point of said virtual camera.

11. A non-transitory storage medium storing a three-dimensional image processing program according to claim 1, wherein
 said input device is a pointing device, and
 said object movement moves said object to the position coordinate designated with said pointing device on the projection plane of said image.

12. A three-dimensional image processing apparatus to output an image obtained by imaging a three-dimensional virtual space with a virtual camera on a display, comprising:

an operation input detector structure configured to detect an operation input from an input device;

an object mover structure configured to move an object within said three-dimensional virtual space or on said image on the basis of the operation input detected by said operation input detector;

a parameter setter structure configured to set a gazing point and a position coordinate of said virtual camera on the basis of a position of said object within said three-dimensional virtual space or on said image; and a view volume structure deformer, including at least one computer processor, configured to deform a view volume of said virtual camera so as not to move a plane including the gazing point of said virtual camera and being in parallel with a projection plane of said image in a case that said object is moved by said object mover.

13. A three-dimensional image processing apparatus to output an image obtained by imaging a three-dimensional virtual space with a virtual camera on a display, comprising:

an operation input detector structure configured to detect an operation input from an input device;

an object mover structure configured to move an object within said three-dimensional virtual space or on said image on the basis of the operation input detected by said operation input detected by said operation input detector;

a displacement amount detector structure configured to detect an amount of displacement of the object with respect to a reference point set within said three-dimensional virtual space or on said image; and a parameter setter structure, including at least one computer processor, configured to set, in a case that the amount of displacement detected by said displacement amount detector is not 0, a parameter of said virtual camera such that said amount of displacement is canceled out, and the position of said object and a vanishing point in said three-dimensional virtual space are overlapped with each other, on the projection plane of said image.

14. A three-dimensional image processing method to output an image obtained by imaging a three-dimensional virtual space with a virtual camera on a display, comprising steps of:

(a) detecting an operation input from an input device;

(b) moving an object within said three-dimensional virtual space or on said image on the basis of the operation input detected by said step (a);

(c) setting a gazing point and a position coordinate of said virtual camera on the basis of a position of said object within said three-dimensional virtual space or on said image; and (d) deforming, using a computer processor, a view volume of said virtual camera so as not to move a plane including the gazing point of said virtual camera and being in parallel with a projection plane of said image in a case that said object is moved by said step (b).

15. A three-dimensional image processing method to output an image obtained by imaging a three-dimensional virtual space with a virtual camera on a display, comprising steps of:

(a) detecting an operation input from an input device;

(b) moving an object within said three-dimensional virtual space or on said image on the basis of the operation input detected by said step (a);

(c) detecting an amount of displacement of the object with respect to a reference point set within said three-dimensional virtual space or on said image; and (d) setting, using a computer processor, in a case that the amount of displacement detected by said step (c) is not 0, a parameter of said virtual camera such that said amount of displacement is canceled out, and the position of said object and a vanishing point in said three-dimensional virtual space are overlapped with each other, on the projection plane of said image.

16. A three-dimensional image processing system to output an image obtained by imaging a three-dimensional virtual space with a virtual camera on a display, the system comprising:

a computer processing system, including at least one computer processor, configured to at least:

detect an operation input from an input device;

move an object within said three-dimensional virtual space or on said image on the basis of the detected operation input;

set a gazing point and a position coordinate of said virtual camera on the basis of a position of said object within said three-dimensional virtual space or on said image; and deform a view volume of said virtual camera so as not to move a plane including the gazing point of said virtual camera and being in parallel with a projection plane of said image in a case that said object is moved.

17. A three-dimensional image processing system to output an image obtained by imaging a three-dimensional virtual space with a virtual camera on a display, the system comprising:

a computer processing system, including at least one computer processor, configured to at least:

detect an operation input from an input device;

move an object within said three-dimensional virtual space or on said image on the basis of the detected operation input;

detect an amount of displacement of the object with respect to a reference point set within said three-dimensional virtual space or on said image; and set, in a case that the detected amount of displacement is not 0, a parameter of said virtual camera such that said amount of displacement is canceled out, and the position of said object and a vanishing point in said three-dimensional virtual space are overlapped with each other, on the projection plane of said image.

* * * * *